United States Patent
Weir et al.

(10) Patent No.: US 9,397,502 B2
(45) Date of Patent: Jul. 19, 2016

(54) SYSTEM AND METHOD FOR PROPORTIONED POWER DISTRIBUTION IN POWER CONVERTER ARRAYS

(71) Applicant: Volterra Semiconductor Corporation, Fremont, CA (US)

(72) Inventors: Steve Weir, Petaluma, CA (US); Eric Macris, San Francisco, CA (US); Eric Lawrence, Sausalito, CA (US)

(73) Assignee: Volterra Semiconductor LLC, San Jose, CA (US)

(*) Notice: Subject to any disclaimer, the term of this patent is extended or adjusted under 35 U.S.C. 154(b) by 607 days.

(21) Appl. No.: 13/922,202

(22) Filed: Jun. 19, 2013

(65) Prior Publication Data

US 2014/0035371 A1  Feb. 6, 2014

Related U.S. Application Data

(63) Continuation-in-part of application No. 12/716,203, filed on Mar. 2, 2010, now Pat. No. 8,686,693.

(60) Provisional application No. 61/202,460, filed on Mar. 2, 2009.

(51) Int. Cl.
*H02J 4/00* (2006.01)
*B60L 11/18* (2006.01)
(Continued)

(52) U.S. Cl.
CPC . *H02J 4/00* (2013.01); *B60L 3/003* (2013.01); *B60L 3/0046* (2013.01); *B60L 3/0069* (2013.01); *B60L 3/04* (2013.01); *B60L 7/14* (2013.01);
(Continued)

(58) Field of Classification Search
CPC .............. H02J 4/00; H01M 2/24; H02M 5/45
See application file for complete search history.

(56) References Cited

U.S. PATENT DOCUMENTS 4,263,644 A   4/1981 Zellmer
4,307,441 A   12/1981 Bello
(Continued)

FOREIGN PATENT DOCUMENTS

JP   11103538   4/1999
JP   H2005-033898   2/2005

OTHER PUBLICATIONS

Lee at al., "Intelligent Control Battery Equalization for Series Connected Lithium-Ion Battery Strings," IEEE Trans. Industrial Electronics, vol. 52, No. 5, Oct. 2005, pp. 1297-1307.
(Continued)

*Primary Examiner* — Kenneth B Wells
*Assistant Examiner* — Rafael Pacheco
(74) *Attorney, Agent, or Firm* — Lathrop & Gage LLP

(57) ABSTRACT

A system and method for proportioned power distribution in arrays of power converters are disclosed. According to one embodiment, a method includes distributing a node-specific transfer function to each node of a plurality of nodes via a communication bus. Each node includes a power converter, and nodes of the plurality of nodes are electrically connected in series. Each node-specific transfer function enables each node to contribute a positive impedance to a total impedance of the plurality of nodes. The computer-implemented method further includes coordinating a setting of a parameter of each node-specific transfer function to regulate a common bus current across the plurality of nodes, and assigning to each node an electrical characteristic based on a parameter of each node-specific transfer function.

54 Claims, 12 Drawing Sheets

(51) Int. Cl.
*H02J 7/00* (2006.01)
*B60L 3/00* (2006.01)
*B60L 3/04* (2006.01)
*B60L 7/14* (2006.01)
*B60L 11/00* (2006.01)
*B60L 11/14* (2006.01)
*H02M 1/00* (2006.01)

(52) U.S. Cl.
CPC ............... *B60L 11/005* (2013.01); *B60L 11/14* (2013.01); *B60L 11/1853* (2013.01); *B60L 11/1866* (2013.01); *H02J 7/0014* (2013.01); *B60L 2210/12* (2013.01); *B60L 2210/14* (2013.01); *B60L 2240/545* (2013.01); *B60L 2240/547* (2013.01); *B60L 2240/549* (2013.01); *H02J 2007/0067* (2013.01); *H02M 2001/0077* (2013.01); *Y02T 10/70* (2013.01); *Y02T 10/7005* (2013.01); *Y02T 10/7022* (2013.01); *Y02T 10/7061* (2013.01); *Y02T 10/7077* (2013.01); *Y02T 10/7225* (2013.01); *Y02T 10/7233* (2013.01); *Y02T 10/92* (2013.01); *Y02T 90/16* (2013.01); *Y10T 307/445* (2015.04)

(56) References Cited

U.S. PATENT DOCUMENTS

| | | |
|---|---|---|
| 4,369,489 A | 1/1983 | Pruitt |
| 4,504,896 A | 3/1985 | Aires et al. |
| 4,504,898 A | 3/1985 | Pilukaitis et al. |
| 4,654,769 A | 3/1987 | Middlebrook |
| 4,709,316 A | 11/1987 | Ngo et al. |
| 4,916,379 A | 4/1990 | Gaubis et al. |
| 5,068,575 A | 11/1991 | Dunsmore et al. |
| 5,101,335 A | 3/1992 | Dunsmore et al. |
| 5,204,809 A | 4/1993 | Andresen |
| 5,521,807 A | 5/1996 | Chen et al. |
| 5,663,874 A | 9/1997 | Mader et al. |
| 5,694,030 A | 12/1997 | Hasegawa et al. |
| 5,701,068 A | 12/1997 | Baer et al. |
| 5,710,504 A | 1/1998 | Pascual et al. |
| 5,745,352 A | 4/1998 | Borghi et al. |
| 5,764,027 A | 6/1998 | Harvey |
| 5,781,419 A | 7/1998 | Divan et al. |
| 5,808,455 A | 9/1998 | Ren et al. |
| 5,917,313 A | 6/1999 | Callahan, Jr. |
| 5,939,866 A | 8/1999 | Bjorkengren |
| 5,945,808 A | 8/1999 | Kikuchi et al. |
| 5,991,171 A | 11/1999 | Cheng |
| 5,998,967 A | 12/1999 | Umeki et al. |
| 6,043,629 A | 3/2000 | Ashley et al. |
| 6,058,030 A | 5/2000 | Hawkes et al. |
| 6,121,751 A | 9/2000 | Merritt |
| 6,137,274 A | 10/2000 | Rajagopalan |
| 6,140,808 A | 10/2000 | Massie |
| 6,141,224 A | 10/2000 | Ma et al. |
| 6,150,795 A | 11/2000 | Kutkut et al. |
| 6,225,794 B1 | 5/2001 | Criscione et al. |
| 6,278,621 B1 | 8/2001 | Xia et al. |
| 6,285,175 B1 | 9/2001 | Massie |
| 6,310,462 B1 | 10/2001 | Arai et al. |
| 6,369,546 B1 | 4/2002 | Canter |
| 6,417,653 B1 | 7/2002 | Massie et al. |
| 6,420,858 B1 | 7/2002 | Kitagawa et al. |
| 6,424,119 B1 | 7/2002 | Nelson et al. |
| 6,437,539 B2 | 8/2002 | Olsson et al. |
| 6,462,962 B1 | 10/2002 | Cuk |
| 6,465,986 B1 | 10/2002 | Haba |
| 6,510,065 B1 | 1/2003 | Massie et al. |
| 6,538,414 B1 | 3/2003 | Tsuruga et al. |
| 6,583,603 B1 | 6/2003 | Baldwin |
| 6,628,533 B2 | 9/2003 | Dinh |
| 6,696,825 B2 | 2/2004 | Harris et al. |
| 6,704,211 B1 | 3/2004 | Vogman |
| 6,771,045 B1 | 8/2004 | Keller |
| 6,801,014 B1 | 10/2004 | Chitsazan et al. |
| 6,842,350 B2 | 1/2005 | Simada et al. |
| 6,873,134 B2 | 3/2005 | Canter et al. |
| 6,903,537 B2 | 6/2005 | Chen et al. |
| 6,924,622 B1 | 8/2005 | Anbuky et al. |
| 7,002,817 B2 | 2/2006 | Lipcsei |
| 7,049,791 B2 | 5/2006 | Lin et al. |
| 7,109,685 B2 | 9/2006 | Tate, Jr. et al. |
| 7,135,836 B2 | 11/2006 | Kutkut et al. |
| 7,135,837 B2 | 11/2006 | Patino |
| 7,157,882 B2 | 1/2007 | Johnson et al. |
| 7,193,392 B2 | 3/2007 | King et al. |
| 7,196,494 B2 | 3/2007 | Baumgartner |
| 7,233,133 B2 | 6/2007 | Chen et al. |
| 7,233,134 B2 | 6/2007 | Huang et al. |
| 7,375,503 B2 | 5/2008 | Bo |
| 7,459,882 B2 | 12/2008 | Morgan |
| 7,459,894 B2 | 12/2008 | Li et al. |
| 7,463,958 B2 | 12/2008 | Suzuki |
| 7,471,065 B2 | 12/2008 | Emori et al. |
| 7,492,124 B2 | 2/2009 | Johnson et al. |
| 2002/0000790 A1 | 1/2002 | Sano et al. |
| 2003/0107352 A1 | 6/2003 | Downer et al. |
| 2004/0189257 A1 | 9/2004 | Dougherty et al. |
| 2005/0052158 A1 | 3/2005 | Meissner |
| 2005/0099159 A1 | 5/2005 | Ishida |
| 2006/0139007 A1 | 6/2006 | Kim |
| 2006/0233000 A1* | 10/2006 | Akagi ............... H02M 5/4585 363/37 |
| 2007/0103121 A1 | 5/2007 | Johnson et al. |
| 2007/0236181 A1 | 10/2007 | Palladino |
| 2007/0247115 A1 | 10/2007 | Ishikawa et al. |
| 2008/0094030 A1 | 4/2008 | Lundy |
| 2008/0231115 A1 | 9/2008 | Cho et al. |
| 2008/0284378 A1 | 11/2008 | Birke et al. |
| 2008/0315839 A1 | 12/2008 | Hermann |
| 2009/0168463 A1 | 7/2009 | Zhao et al. |
| 2009/0208821 A1* | 8/2009 | Kosugi ............... B60L 3/0046 429/61 |
| 2009/0289599 A1 | 11/2009 | White et al. |
| 2009/0295348 A1 | 12/2009 | Tao et al. |
| 2009/0295349 A1 | 12/2009 | Tao et al. |
| 2009/0295350 A1 | 12/2009 | Yamada |
| 2009/0295351 A1 | 12/2009 | Kudo et al. |
| 2010/0090649 A1 | 4/2010 | Sardat et al. |
| 2010/0207587 A1 | 8/2010 | Oyobe et al. |
| 2010/0225277 A1 | 9/2010 | Ochi et al. |
| 2010/0305770 A1 | 12/2010 | Bhowmik |

OTHER PUBLICATIONS

Walker et al., "Cascaded DC-DC Converter Connection of Photovoltaic Modules," IEEE Trans. Power Electronics, vol. 19, No. 4, Jul. 2004, pp. 1130-1139.

Wolfs et al., "Distributed Maximum Power Tracking for High Performance Vehicle Solar Arrays," AUPEC 2004, Sep. 26-29, 2004, 6 pages.

* cited by examiner

SYSTEM AND METHOD FOR PROPORTIONED POWER DISTRIBUTION IN POWER CONVERTER ARRAYS

The present application is a continuation-in-part of and claims the benefit of and priority to U.S. patent application Ser. No. 12/716,203 entitled "SYSTEMS AND METHODS FOR SCALABLE CONFIGURATIONS OF INTELLIGENT ENERGY STORAGE PACKS" filed on Mar. 2, 2010, now U.S. Pat. No. 8,686,693 which claims the benefit of and priority to U.S. Provisional Patent Application No. 61/202,460 entitled "SYSTEMS AND METHODS FOR SCALABLE CONFIGURATIONS OF INTELLIGENT ENERGY STORAGE PACKS" filed on Mar. 2, 2009, the disclosures of which are hereby incorporated by reference in their entirety.

FIELD

The present application relates generally to power converters. In particular, the present disclosure is directed to systems and methods for proportioned power distribution in power converter arrays.

BACKGROUND

Power converters, such as switched-mode power supplies (SMPS), convert input current and input voltage from a source to a different output current and output voltage at a load. Multiple power converters, each having an independent output power, can be electrically connected together in series and parallel arrays to serve a range of applications, including multi-cell battery packs, lighting arrays, computing systems with multiple processors, heating arrays, and electric motors. Such power converter arrays, however, can become unstable without design consideration of the interactions among the multiple power converters. Moreover, these arrays do not enable a dynamic assignment of desired proportioning of power to and from the power converters in the array.

In one application, a power converter array is used for a multi-cell battery pack. Battery packs, or arrangements of multiple energy storage cells coupled together, are used as power sources in a host of devices. The devices include all-electric vehicles, hybrid electric vehicles, portable electronic devices, military applications, medical devices, back-up power and distributed energy storage systems in residential and business locations. Improvements in underlying electro-chemistry have yielded batteries with improved performance characteristics, for example, the Li-ion battery. However, even where multiple energy storage cells are intended to be the same in structure and performance characteristics, there are differences among individual energy storage cells. Even with state-of-the-art manufacturing, energy storage cells are inherently dissimilar and demonstrate variations in capacity, lifetime, rates of charge/discharge, and other inter-related properties. For example, a battery pack containing a collection of individual cells may exhibit cell-to-cell differences in energy storage capacity of 2-3% when new, and the variation of energy storage capacity among individual cells tends to increase over time (e.g., as the battery pack ages and is charged and discharged multiple times). Since individual cells of a conventional battery pack may be electrically connected in series to form a series string, the overall performance of the battery pack is degraded by the performance of the weakest cell in the series. For example, with conventional pack architectures, in a series string of cells, the first cell that becomes discharged during use negatively limits the discharge capability of other cells in the series.

Conventional approaches have attempted to address the aforementioned problems and improve the performance of battery packs by providing charge balancing, i.e., electronic circuitry intended to equalize cell voltages or states of charge. Such charge-balancing systems include electrical switches and other electrical elements (e.g., resistors, capacitors, inductors) present at each cell, or grouping of cells, of the battery pack. In such charge balancing systems, resistors may be intermittently connected in parallel with cells in a coordinated manner to equalize cell charging voltages by shunting excess current. In other charge balancing systems, capacitors or inductors are intermittently connected in parallel with cells, such that charge can be transferred from relatively-high-voltage cells to relatively-low-voltage cells. In this manner, performance variations among cells are partially managed so that cells in the battery pack converge toward a desired voltage or state of charge.

Conventional switched-resistor, switched-capacitor, and switched-inductor battery management system architectures provide only partial solutions to the problem of performance variation among cells in multi-cell packs. These battery management systems have only a limited ability to accommodate variations in cell capacity, lifetime, maximum rates of charge/discharge, and other properties of multi-cell packs. Moreover, conventional battery management systems, while compensating for usage performance, may actually reduce the useable lifetime of cells in a battery pack. As a result, in conventional battery packs, useful lifetime is diminished and is typically limited by the weakest cells in the pack.

A prior method of managing the differences performance in cells is by charging and discharging each individual cell in a battery pack at a unique rate so that all cells in the battery pack are at the same proximate state of charge at any given moment.

A prior system to realize independent charge and discharge currents is a parallel converter arrangement. In this arrangement, each electrochemical cell is coupled to an independent power converter that is connected directly to the charging and load bus. The combination of each cell and the corresponding power converter draws a fraction of charge current during the charge phase, and delivers a fraction of load current during the load phase. For each charging or discharging phase, a control mechanism distributes two coefficients to the power converters—a proportionality coefficient that only needs to change at a low rate sufficient to maintain cell state-of-charge matching across cells in the battery pack; and a scaling coefficient that tracks real-time power response requirements of the application. The proportionality and scaling coefficients can be arranged to represent either current or power. The output power of the DC-DC converter on the bus vs. the power across the cell is the efficiency of the DC-DC converter in the charge direction, and the reciprocal of the DC-DC converter efficiency in the discharge direction.

The disadvantages of the parallel converter approach include the need for a power converter coupled to each cell that can tolerate the entire voltage of the charge/load bus. In situations where the charge/load bus operating voltage is many times that of each cell, conversion efficiency is limited, and implementation is costly, typically requiring a step-down/step-up transformer, one or more switching transistors on either side of the transformer, as well as a bias power supply for the bus side control circuits. Efficient operation and economic implementation further limit the range of bus voltages that a given DC-DC converter implementation can accommodate. For example, a DC-DC converter suitable for a 50V bus would require a different transformer and bus-side power electronics than a DC-DC converter suitable to a 300V bus.

SUMMARY

A system and method for proportioned power distribution in arrays of power converters are disclosed. According to one embodiment, a method includes distributing a node-specific transfer function to each node of a plurality of nodes via a communication bus. Each node includes a power converter, and nodes of the plurality of nodes are electrically connected in series. Each node-specific transfer function enables each node to contribute a positive impedance to a total impedance of the plurality of nodes. The computer-implemented method further includes coordinating a setting of a parameter of each node-specific transfer function to regulate a common bus current across the plurality of nodes, and assigning to each node an electrical characteristic based on a parameter of each node-specific transfer function.

The above and other preferred features, including various novel details of implementation and combination of events, will now be more particularly described with reference to the accompanying figures and pointed out in the claims. It will be understood that the particular methods described herein are shown by way of illustration only and not as limitations. As will be understood by those skilled in the art, the principles and features described herein may be employed in various and numerous embodiments without departing from the scope of the invention.

BRIEF DESCRIPTION OF THE DRAWINGS

The accompanying figures, which are included as part of the present specification, illustrate the presently preferred embodiments of the present invention and together with the general description given above and the detailed description of the preferred embodiments given below serve to explain and teach the principles of the present invention.

DETAILED DESCRIPTION

Figure 1:
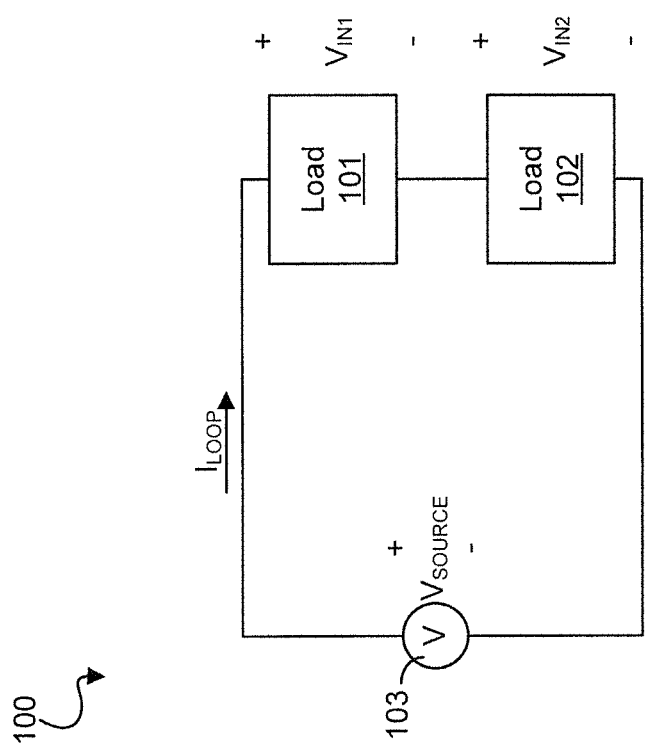
FIG. 1 illustrates an exemplary network with a series string of loads that are independently regulated by power converters, according to one embodiment.

A system and method for proportioned power distribution in arrays of power converters are disclosed. According to one embodiment, a method includes distributing a node-specific transfer function to each node of a plurality of nodes via a communication bus. Each node includes a power converter, and nodes of the plurality of nodes are electrically connected in series. Each node-specific transfer function enables each node to contribute a positive impedance to a total impedance of the plurality of nodes. The computer-implemented method further includes coordinating a setting of a parameter of each node-specific transfer function to regulate a common bus current across the plurality of nodes, and assigning to each node an electrical characteristic based on a parameter of each node-specific transfer function.

The present system and method provide stable operation of a power converter array such that a single power input into the array is converted and divided into an independent user-defined proportioning of power outputs across the power converters in the array. The proportioning remains constant over widely varying input and output current and voltage conditions. Similarly, but operating in the reverse direction, the present system and method provide stable operation of a power converter array such that multiple, differing user-defined proportioning of power inputs into the array are converted and summed into a single, unified power output, while enabling the user-defined proportioning of power across the multiple converters to remain constant over widely varying input and output current and voltage conditions. Furthermore, the system and method allow the proportioning to be adjusted dynamically.

The present system and method can be applied to a broad range of applications, including applications where a single input power source is converted and divided efficiently and optimally across multiple, disparate loads, such as an array of light-emitting diodes, an array of computer processors, and an array of disparate energy storage cells being charged; and applications where multiple, differing power inputs are converted and unified to produce a stable, single power output, such as an array of energy storage cells being discharged.

According to one embodiment, the present disclosure describes an application with an array of energy storage cells. Such examples are particularly instructive in that energy storage cells in a multi-cell battery pack operate under variable input and output current and voltage conditions, and require bidirectional current flow.

For simplicity, the illustrative examples provided herein describe series strings of power converters. Those skilled in the art will appreciate that variations can be made to the present architecture without departing from the spirit and scope of the present disclosure. For example, based on principles of duality of electrical circuits, variations of the present architecture can be made by appropriate substitution of series for parallel configurations, substitution of inductors for capacitors, and substitution of currents for voltages, while maintaining the desired functionality. Another variation includes a combination of series and parallel strings of power converters. Such variations are considered to be within the scope of the present disclosure in light of the teachings presented herein.

In one embodiment, the present system and method address performance variations associated with individual energy storage devices (generally referred to herein as cells) in multi-cell energy storage packs. Exemplary energy storage devices include electromechanical cells, super capacitors, magnetic energy storage devices, flywheels and associated electrical conversion circuitry, and other storage devices for the storage of electrical energy.

In one embodiment, the present system and method accommodate cell-to-cell variability by electrically buffering each cell from other cells in an energy storage pack. In other words, each cell of the energy storage pack is fully and independently managed with respect to a predefined proportion of total energy delivered to or extracted from the cell.

In one embodiment, the present system and method also provides buffering of groups of cells, rather than individual cells. In other words, a group of multiple cells is managed fully and independently from other cells and/or cell groups.

In one embodiment, the present system and method enable buffered cells to be placed in series strings without compromising individual cell performance. High-voltage, long series strings are desirable for most high-power applications, such as automotive and grid-interactive solutions. Shorter series strings are desirable in many other lower-power applications such as mobile electronics devices (e.g., laptop computers). For energy storage packs with series strings of cells, the present system and method controls power flow in and out of each cell to be controlled based on a pre-assigned proportion of the overall power on a system bus.

In one embodiment, the present system and method buffer each cell from the other cells by placing a bi-directional DC-DC converter between each cell and the other cells. The DC-DC converters themselves may be placed in long series strings to reach high aggregate voltage outputs. The DC-DC converters enable the voltage and current at the cell to differ from the voltage and current at the output of the corresponding DC-DC converter. The difference in input versus output voltage and current achieves the aforementioned electrical buffering and maintains a pre-assigned proportion of the overall power on a system bus.

In one embodiment, according to the present system and method, DC-DC converters compensate electrically for any impedance differences among the connections to the electrically buffered cells. In conventional battery packs, performance is hindered by impedance differences among the electrical connections to the cells. This problem is compounded by the temperature sensitivity of electrochemical cells, and limits the use of welding or soldering to make reliable electrical connections of uniform impedance. In addition to their ability to compensate for these impedance differences, the DC-DC converters of the present system are robust compared to electrochemical cells and include electrical tabs that are easily welded or soldered.

According to the present system and method, high aggregate voltage outputs are achieved while minimizing system heat losses. The DC-DC converters transform an input source voltage to a higher or lower output voltage. System energy losses and heat generation in the DC-DC converter circuit are typically proportional to the difference between input and output voltages, which is an inherent characteristic of all DC-DC converter designs. For example, a large step-up ratio between input and output voltages typically results in large energy losses. In the present system and method, such energy losses are minimized by minimizing the differences between input and output voltages. By placing the DC-DC converters in series strings, high aggregate output voltages are achieved while each DC-DC converter contributes a relatively low voltage to the string.

Moreover, since each DC-DC converter operates at a relatively low voltage, the DC-DC converter circuit of the present system is built from relatively inexpensive components. For example, a low-voltage DC-DC converter is built with relatively inexpensive MOSFET switches, whereas a similar DC-DC converter operating at high voltages would be more optimally built with relatively expensive Insulated Gate Bipolar Transistor (IGBT) switches.

According to one embodiment, multiple control circuits, each being connected to its own energy storage cell, are connected in a series string to provide a multi-cell storage pack. Each control circuit and corresponding energy storage cell are a part of a node of the series string. The processing circuitry of each control circuit communicates with a central controller to provide a specified output voltage at each node in a multi-cell storage pack while maintaining a pre-assigned proportion of the overall power on a system bus.

According to one embodiment, the present system and method uses either a central controller or a function of the central controller implemented in a distributed processing system. According to another embodiment, a distributed processing system is embedded as software in the control circuits of the nodes of a multi-node energy storage pack.

According to one embodiment, an energy storage control system includes a plurality of nodes where the nodes are electrically connected together in series for storing and providing electrical energy. A central controller communicates with and controls the plurality of electrical nodes. Each node includes an electrical converter circuit for controlling the corresponding energy storage cell by transforming an input voltage from the cell to a desired output voltage or by transforming an input current from the cell to a desired output current. In one embodiment, each node includes a sensing system for sensing electrical characteristics of an energy storage cell connected to the electrical converter circuit, a processing system for controlling the electrical converter circuit of the corresponding energy storage cell using information from the sensing system, and a driving system for driving the electrical converter circuit using information from the processing system. The central controller communicates with and instructs the processing system of each node so as to maintain a pre-assigned proportion of the overall power on a system bus.

In one embodiment, the present system and method provide energy storage packs having high-voltage series strings that facilitate efficient DC/AC conversion in systems for propulsion drives (e.g., for electric or hybrid vehicles) or on-grid or off-grid stationary powering systems. For high-voltage applications, the conversion from DC to AC is more efficient at higher input DC voltages. For example, high-voltage energy storage packs according to exemplary embodiments described herein, an intermediate DC/DC up-converter, which is typically needed between a cell-pack and DC/AC converter, may be eliminated. In the following description, for purposes of explanation, specific nomenclature is set forth to provide a thorough understanding of the various inventive concepts disclosed herein. However, it will be apparent to one skilled in the art that these specific details are not required in order to practice the various inventive concepts disclosed herein.

The present system and method also relates to an apparatus for performing the operations described herein. This apparatus may be specifically constructed for the required purposes, or it may comprise a general-purpose apparatus configured and controlled by a computer program stored in a computer. Such a computer program may be stored in a computer-readable storage medium, such as, but not limited to: floppy disk drives, optical disks, CD-ROMs, and magnetic-optical disks, read-only memories (ROMs), random access memories (RAMs), EPROMs, EEPROMs, magnetic or optical cards, or any other type of medium suitable for storing electronic instructions and coupled to a computer system bus.

The algorithms and displays presented herein are not inherently related to any particular computer or other apparatus. Various general-purpose systems may be used with programs in accordance with the teachings herein, or it may prove convenient to construct more specialized apparatus to perform the required method steps. The required structure for a variety of these systems will be apparent from the description below.

The present system and method assign an electrical characteristic to each node of a plurality of nodes. Such an electrical characteristic may include, but is not limited to, voltage, energy over time, and a proportion of the aggregate power across the plurality of nodes. For simplicity, the present disclosure describes distributing an aggregate power across a plurality of nodes so that the power delivered to or extracted from each of the nodes closely approximates an assigned proportion of total aggregate power delivered to or extracted from the nodes in real time.

The present system includes real-time control of an array of nodes. The present system controls the nodes together so that each node sources or sinks a pre-assigned proportion of the overall power on a system bus. In other words, the nodes maintain pre-assigned ratios of the overall power without disruption regardless of the variation of the overall power on the system bus.

The present system and method allow the node power control function to maintain the assigned power proportion across dynamically varying changes while transferring power between the bus and the local power load/source, including under conditions of varying bus current, bus source voltage and/or aggregate source impedance. The present system and method allow dynamic reassignment of node power proportions in real time without disrupting the operation of the present system. The power proportions and total bus power may be re-assigned to adjust the average power and/or the total energy exchanged between the bus and each node as well as the array of nodes over a given time interval.

According to one embodiment, each node withstands a maximum bus-side voltage that is a small fraction of the total aggregate bus voltage. In other words, each node need not be designed to withstand the entire aggregate bus voltage. The maximum voltage that each node must be able to withstand is at least equal to the total maximum voltage of the series string divided by the number of nodes. In one embodiment, the maximum voltage that each node must be able to withstand is twice the maximum voltage of the series string divided by the number of nodes.

The present system and method is stable with power sources and loads that have widely ranging impedances. In particular, the present system and method supports stable operation without the requirements of a large voltage compliance range and/or external current regulation circuitry. The present system and method are highly scalable and are capable of maintaining stable operation across arrays containing long series strings of nodes.

The present disclosure describes a system and method that may be applied whether the nodes draw power from the power bus or supply power to the power bus. In other words, the operating principles are similar regardless of the direction of energy flow into or out of the nodes. For simplicity, when providing illustrative examples, the present disclosure focuses on delivering power to nodes of the power bus. In practice, the bus side of the switched-mode power converter incorporated into each node may operate as either an input based on the bus delivering power to the nodes, or an output based on the nodes delivering power to the bus. For simplicity, where not otherwise specified, the present disclosure refers to the bus side of the power converter as the input.

Switched-mode power converters convert input current $I_{IN}$ and input voltage $V_{IN}$ from a source to a different output current $I_{OUT}$ and output voltage $V_{OUT}$ at a load. In an ideal case of loss-less power conversion, output power $P_{OUT}$ delivered to the load is equal to the input power $P_{IN}$ drawn from the energy source:

$$P_{IN} = P_{OUT}$$

$$V_{IN} * I_{IN} = V_{OUT} * I_{OUT}$$

In a typical implementation such as where a switched-mode power converter operates independently to regulate output power to produce a fixed output power $P_{OUT\_FIXED}$, the input power/output power equality give rise to a negative impedance characteristic at the input:

$$P_{IN} = P_{OUT\_FIXED}$$

$$V_{IN} * I_{IN} = P_{OUT\_FIXED}$$

$$I_{IN} = P_{OUT\_FIXED} / V_{IN}$$

For a given regulated output power, increasing values of $V_{IN}$ reduce $I_{IN}$, while decreasing values of $V_{IN}$ increase $I_{IN}$, resulting in a negative impedance.

In a serial string of multiple independently regulated switched-mode power converters where the inputs of the switched-mode power converters couple to the serial bus and the output of each power converter connects to an independent load, power regulation is systemically unstable. In such a series configuration, a common current flows through the inputs of all serially connected switched-mode power converters, and the negative input impedance characteristic of each switched-mode power converter operating independently to regulate its own power output introduces a positive feedback that destabilizes the system.

FIG. 1 illustrates an exemplary network with a series string of loads that are independently regulated by power converters, according to one embodiment. System 100 includes an energy source 103 with a source voltage $V_{SOURCE}$, and two serial loads 101 and 102 that each include a switched-mode power converter regulating power $P_{OUT\_NOM}$ to a load. In an ideal steady state with 100% conversion efficiency:

$$P_{IN1} = P_{IN2} = P_{OUT\_NOM},$$

where $P_{IN1}$ and $P_{IN2}$ are the respective load powers of the loads 101 and 102. From Kirchhoff's voltage law:

$$V_{IN1} + V_{IN2} = V_{SOURCE},$$

where $V_{IN1}$ and $V_{IN2}$ are the respective voltage drops across the loads 101 and 102. From Kirchhoff's current law:

$$I_{LOOP} = I_{IN1} = I_{IN2},$$

where $I_{LOOP}$ is the loop current of the system 100, $I_{IN1}$ and $I_{IN2}$ are the respective load currents across the loads 101 and 102.

Therefore, an operating point theoretically exists:

$$V_{IN1} = V_{IN2} = V_{SOURCE}/2$$

$$I_{IN1} = I_{IN2} = I_{LOOP} = P_{OUT\_NOM} * 2 / V_{SOURCE}$$

However, when a small amount of real or perceived voltage disturbance $V_{DISTURBANCE}$ occurs at either load 101 or 102, the system 100 is immediately destabilized because $V_{DISTURBANCE}$ creates conflicting requirements for each independent control loop governing the loads 101 and 102. From Kirchhoff's voltage law:

$$V_{IN1} + V_{IN2} = V_{SOURCE}$$

$$V_{IN1} = V_{SOURCE}/2 + V_{DISTURBANCE}$$

$$V_{IN2} = V_{SOURCE}/2 - V_{DISTURBANCE}$$

From Kirchhoff's current law:

$$I_{LOOP} = I_{IN1} = I_{IN2}$$

The independent regulation function of each power converter requires the loads 101 and 102 to have the following regulated load currents $I_{IN1\_REQUIRED}$ and $I_{IN2\_REQUIRED}$ respectively:

$$I_{IN1\_REQUIRED} = P_{OUT\_NOM}/V_{IN1} = P_{OUT\_NOM}/(V_{SOURCE}/2 + V_{DISTURBANCE})$$

$$I_{IN2\_REQUIRED} = P_{OUT\_NOM}/V_{IN2} = P_{OUT\_NOM}/(V_{SOURCE}/2 - V_{DISTURBANCE})$$

Thus, Kirchhoff's current law forces the respective load currents $I_{IN1}$ and $I_{IN2}$ across the loads 101 and 102 to be equal. However, when voltage disturbance is introduced to the system, regulation of each independently operating regulated switched-mode power converter requires differing, divergent values for load currents $I_{IN1\_REQUIRED}$ and $I_{IN2\_REQUIRED}$. This conflict results in a systemic instability. The positive feedback characteristics of independent switched-mode power converter regulation dictates that when noise disturbance or errors are present, each independent switched-mode power converter control loop acts to drive the system away from equilibrium. Therefore, in the presence of a noise disturbance or error, independent output regulation of serially connected switched-mode power converters is not possible.

Another cause of systemic instability is that each regulated switched-mode power converter operates autonomously without any planned accommodation of the operating requirements of the other power converters in the series string. As a result, if the power across a power converter moves toward a new power value, the other power converters are driven toward diverging bus currents.

The present system and method solve the instability problem by implementing three design elements: Firstly, the present system provides a master-slave arrangement that includes a central bus power control function and a transfer function performed at each node operating as a slave. Secondly, the transfer function at each slave node enables each node to contribute a positive impedance to a total impedance of a plurality of nodes connected in series. Thus, increasing voltage across a node increases both current and power through the node. Thirdly, the transfer function of each node exhibits a bus power transfer value that is proportional to a control coefficient assigned by the central control.

Figure 2:
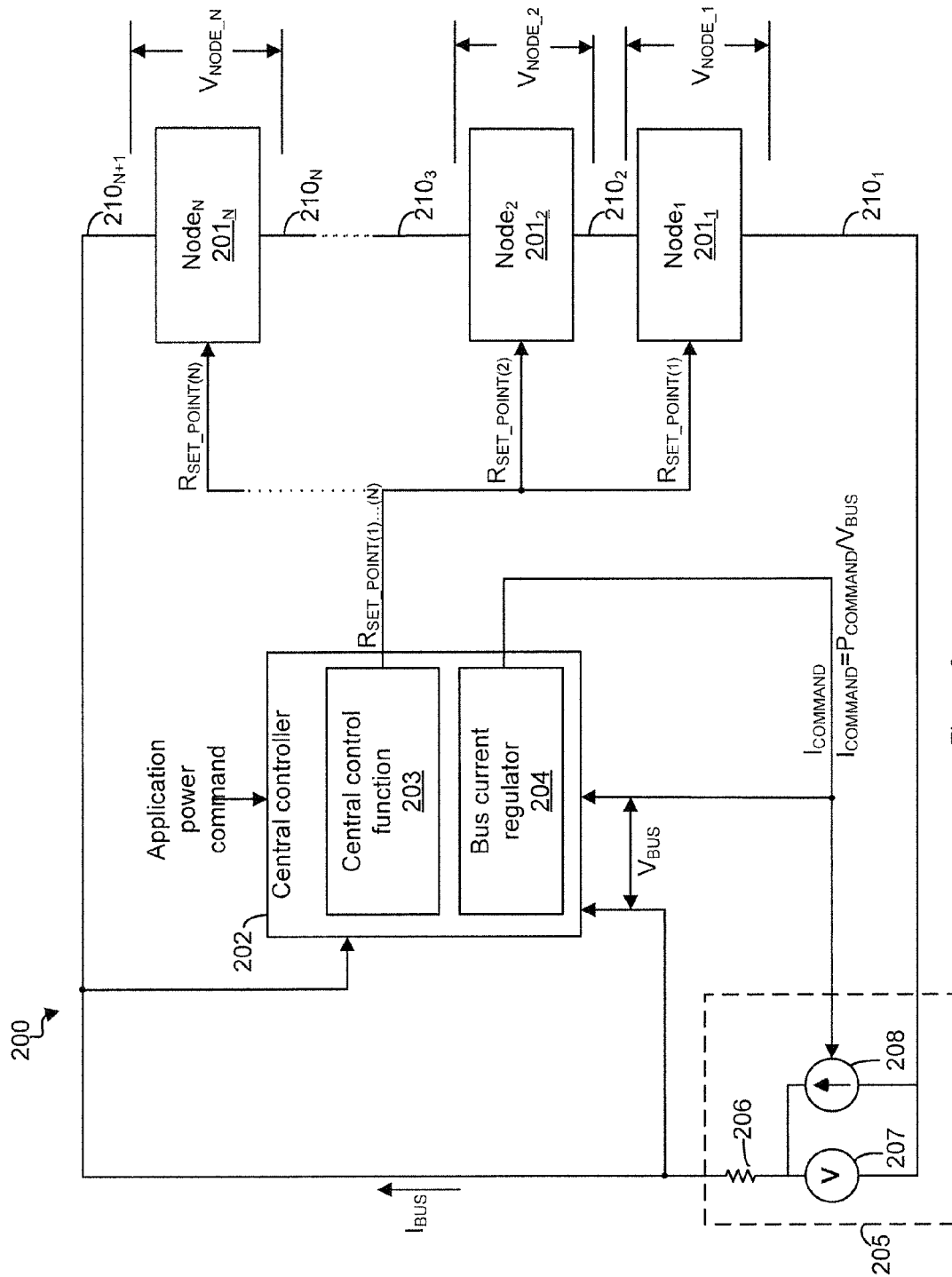
FIG. 2 illustrates an exemplary series string of nodes with a central bus current regulator for serial power distribution, according to one embodiment.

FIG. 2 illustrates an exemplary series string of nodes with a central bus current regulator for serial power distribution, according to one embodiment. The system 200 includes a central controller 202 and N number of nodes 201. A bus power source 205 including a voltage source 207 ($V_{SOURCE}$), a current source 208 ($I_{SOURCE}$) and an internal resistance 206 ($R_{SOURCE}$) delivers power to nodes 201 interconnected by bus 210. The bus power source 205 may be a bus power sink that absorbs power supplied by the nodes 201. In this case, the direction of $I_{BUS}$ reverses. The central controller 202 distributes transfer function coefficients at each node to regulate bus input power drawn by each node so that each node (e.g., $201_N$) draws a specific proportion of the total input power. The central controller 202 includes a bus current regulator 204 that varies the bus current of current source 208 based on a bus voltage $V_{BUS}$ and an externally supplied application power command, thus regulating bus source power. In one embodiment, the transfer function of an exemplary node $201_N$ is a resistance value particular to that node $201_N$ (e.g., $R_{SET\_POINT(N)}$).

In this embodiment, independent output-power regulation no longer occurs at each node 201. A central control function 203 of the central controller 202 distributes independent transfer function coefficients $R_{SET\_POINT}$ to each node 201. The power $P_{(N)}$ through the exemplary node $201_N$ may be defined as follows:

$$P_{(N)} = I_{BUS}^2 * R_{SET\_POINT(N)}$$

The total power $P_{BUS}$ through the bus is the summation of power through all nodes 201:

$$P_{BUS} = I_{BUS}^2 * \left( \sum_{M=1}^{M=N} R_{SET\_POINT(M)} \right)$$

The bus current regulator 204 controls the bus current while each node 201 emulates a resistive transfer function. The actual power absorbed at the load of each node 201 becomes a function of switched-mode power converter output to input power efficiency, and cross-regulation of all nodes against their respectively assigned $R_{SET\_POINT}$ values, and finally the central regulation of $I_{BUS}$.

The bus current regulator 204 maintains an average bus current $I_{COMMAND}$ as long as:

$$V_{SOURCE} > I_{COMMAND} * \left( R_{SOURCE} + \sum_{M=1}^{M=N} R_{SET\_POINT(M)} \right)$$

Noise disturbance at the exemplary node $201_N$ may increase or decrease the voltage drop $V_{NODE\_N}$ across the node $201_N$. The power $P_{(N)}$ through the node $201_N$ increases or decreases correspondingly. However, due to the bus current regulator 204, bus current $I_{BUS}$ does not change and the operation of the nodes 201 is ideally unaffected. In practice, total bus current varies according to the design specifications of the bus current regulator 204. The bus current regulator 204 may be designed to achieve extremely small sustained disturbance.

The power input to each node 201 proportions to the corresponding transfer function coefficient $R_{SET\_POINT(N)}$. In the first-order approximation where power conversion efficiency at each node 201 is identical, the power output of each node 201 is also proportional to $R_{SET\_POINT(N)}$.

Long term average power through each node 201 may be regulated by feeding actual measured output power values to central controller 202 that periodically adjusts the values of each $R_{SET\_POINT(N)}$ and $I_{BUS}$ to compensate for imperfect power conversion efficiency, circuit accuracy errors, drift, load changes at each node, and/or other aberrations.

The major disadvantage of the central bus current regulator arrangement as illustrated in FIG. 2, occurs when the bus current regulator 204 is not inherent to the bus power source 205. In such situations, the central current regulator function adds undesirable cost, physical space, and power efficiency impairment.

According to one embodiment, the present system develops a means of serial power distribution that exhibits the stability of a central current regulator, but does not require power electronics in excess of the switched-mode power converter at each serially connected node.

Figure 3A:
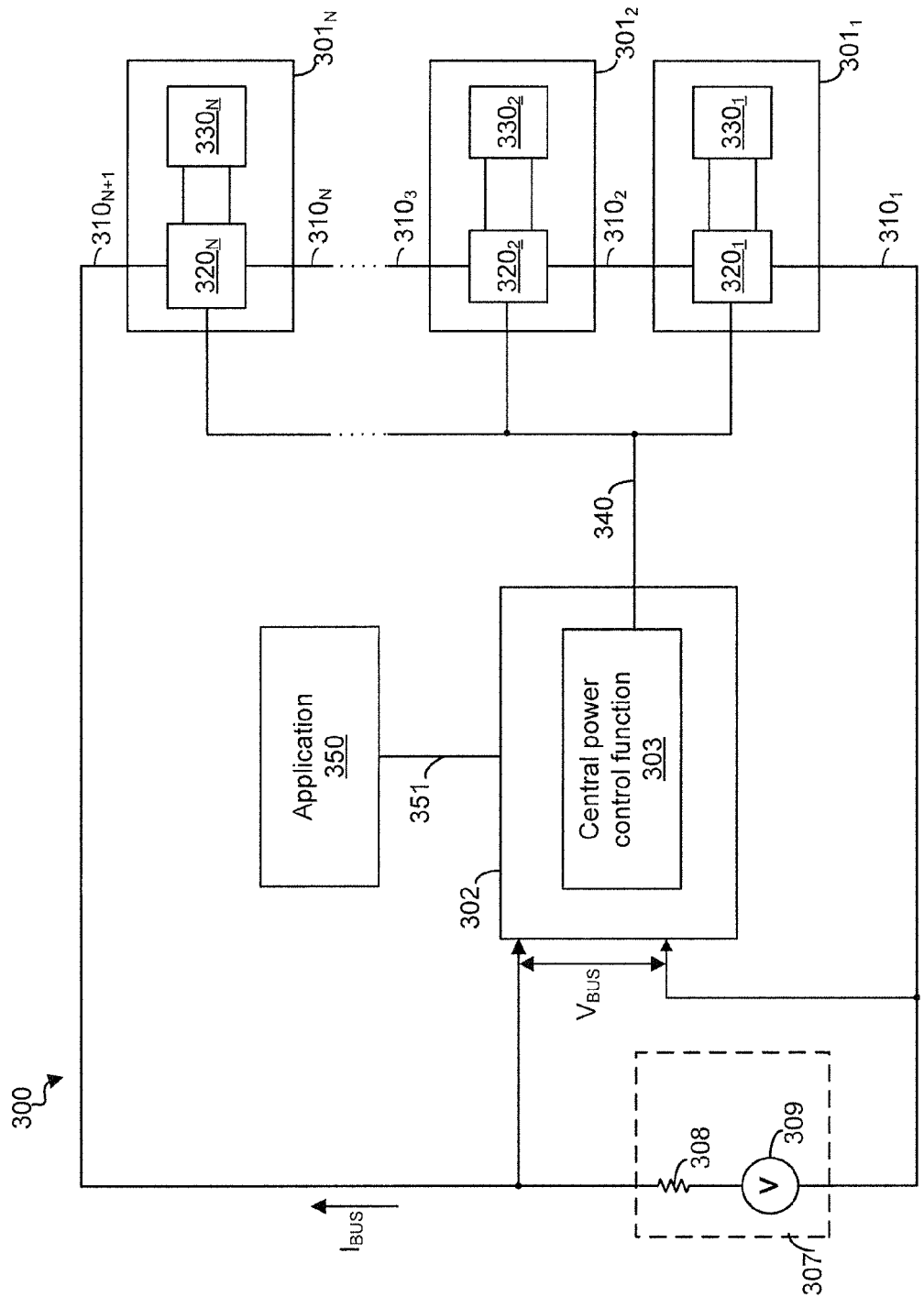
FIG. 3(a) illustrates an exemplary series power distribution system, according to one embodiment.

FIG. 3(a) illustrates an exemplary series power distribution system, according to one embodiment. The system 300 includes a central controller 302 and N number of nodes 301 connected to a power bus 310. A bus power source 307 including a voltage source 309 ($V_{SOURCE}$), and an internal resistance 308 ($R_{SOURCE}$) delivers power to nodes 301 via the serial power bus 310. In another embodiment, the bus power source 307 may be a bus power sink that absorbs power supplied by the nodes 301 via the power bus 310. According to one embodiment, the central controller 302 includes a central power control function 303 that provides a set of node-specific transfer function coefficients based on application power demand received from an application 350 via a communication bus 351, and a total bus voltage $V_{BUS}$. The central power control function 303 communicates the transfer coefficients to the plurality of nodes 301 via a communication bus 340. According to one embodiment, an exemplary node 301$_N$ includes a power control circuit 320$_N$, and a load 330$_N$. In another embodiment, the load 330$_N$ may be a power source. In another embodiment, the load 330$_N$ may be an energy storage device that either performs as a load or a power source at various times. The power control circuit 320$_N$ of the node 301$_N$ regulates power exchange between the power bus 310 and the load 330$_N$ based on the transfer function coefficients received from the central power control function 303, a bus voltage across the bus segments 310$_{N+1}$ to 310$_N$, and a bus current through the node 301$_N$. The power control circuit 320$_N$ ensures that the exchanged power is proportional to a node-specific transfer function coefficient provided by the central power control function 303. The communication bus 340 may distribute the set of node-specific transfer function coefficients by any analog or digital communication means known to one ordinary skilled in the art, including but not limited to an analog distribution of a current loop value, a digital distribution of a pulse width modulation (PWM), pulse position modulation (PPM), pulse amplitude modulation (PAM) and a message based signal format and combinations thereof.

Figure 3B:
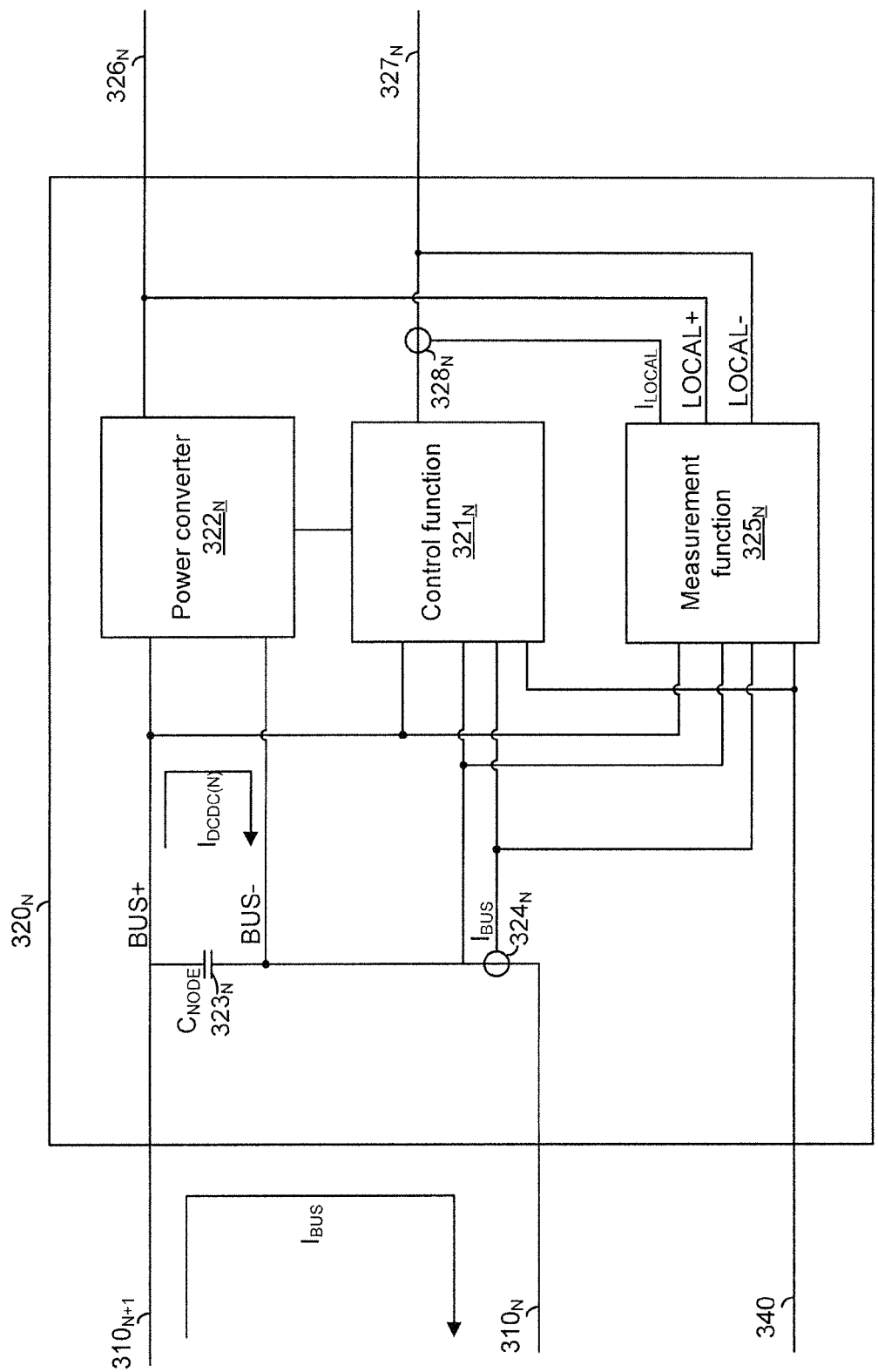
FIG. 3(b) illustrates an exemplary power control circuit of a node, according to one embodiment.

FIG. 3(b) illustrates an exemplary power control circuit of a node, according to one embodiment. The power control circuit 320$_N$ includes a switched-mode power converter 322$_N$, a bus capacitor 323$_N$, a bus current sense means 324$_N$, bus segments 310$_{N+1}$ and 310$_N$ that are connected to a power bus, connection buses 326$_N$ and 327$_N$ to the load 330$_N$ (as illustrated in FIG. 3(a)), a load current sense means 328$_N$ and the communication bus 340. A control function 321$_N$ of the power control circuit 320$_N$ varies the operating point of switched-mode power converter 322$_N$ based on a measured bus voltage across bus segments 310$_{N+1}$ and 310$_N$, a serial bus current $I_{BUS}$ sensed by the current sense means 324$_N$, and the transfer function coefficients received over the communication bus 340. The bus capacitor 323$_N$ limits the time rate of voltage change across the node due to short-term differences between the serial bus current $I_{BUS}$ and a bus-side switched-mode power converter current $I_{DCDC\_BUS(N)}$ through the power converter 322$_N$. The power converter 322$_N$ connects to a load 330$_N$ as illustrated in FIG. 3(a) via connection buses LOCAL+ 326$_N$, and LOCAL− 327$_N$. The control function 321$_N$ reports bus voltage and current to a measurement function 325$_N$ in the power control circuit 320$_N$. The measurement function 325$_N$ performs signal processing on bus-side and load side voltage and current measurements and reports the processed measurements to the central power control function 303 via the communication means 340. In one embodiment, the central power control function 303 evaluates the processed bus-side voltage and current measurements of each node 301$_N$ to calibrate individual node performance and provide corrections in the transfer function coefficients that are communicated to the nodes 301. In another embodiment, the central power control function 303 evaluates the processed load-side voltage and current measurements of each node 301$_N$ and adjusts the transfer function coefficients that are communicated to each node 301$_N$ based on the evaluation to realize a desired load-side power transfer at each node 301$_N$.

Figure 4:
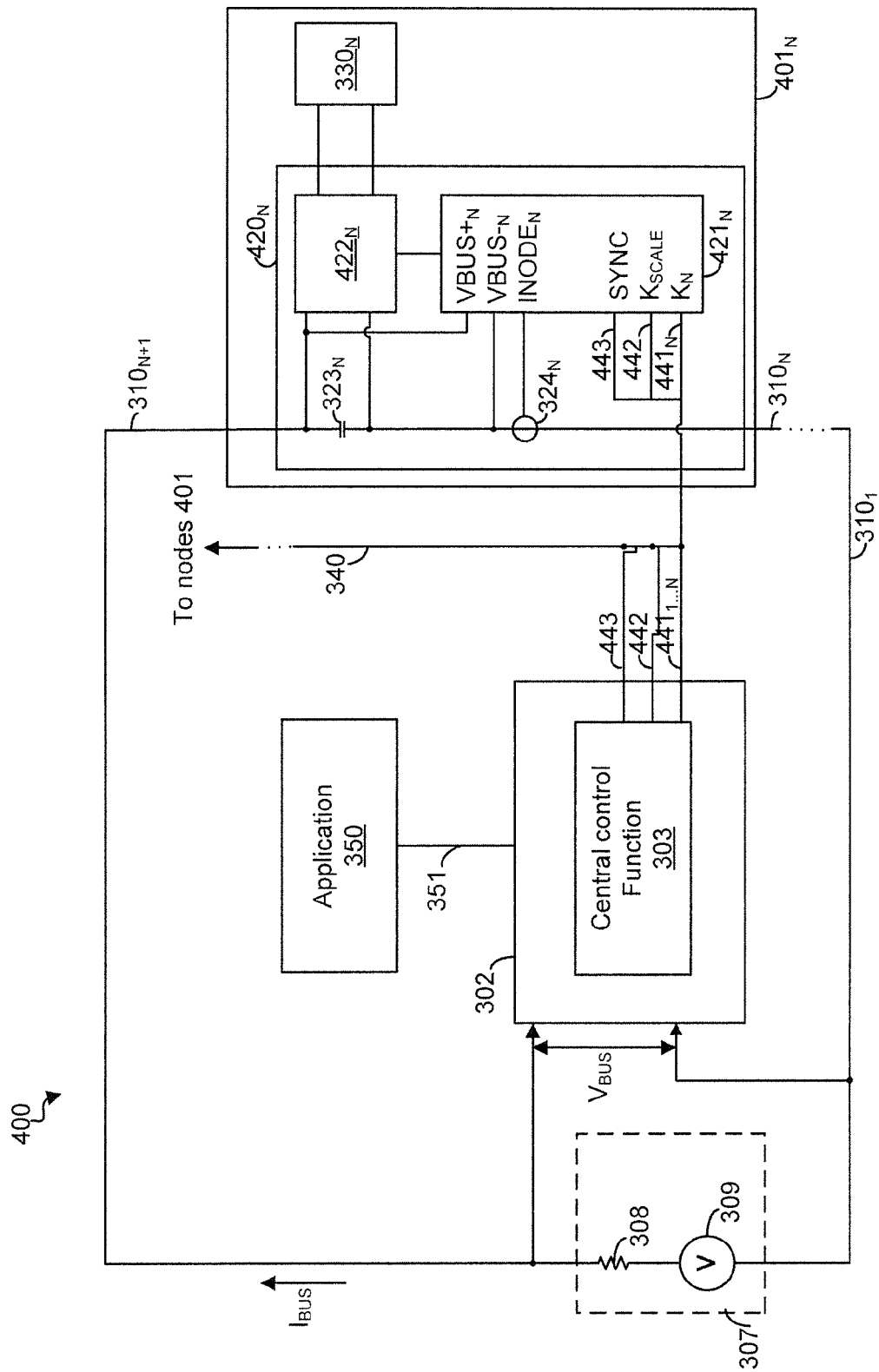
FIG. 4 illustrates another exemplary series power distribution system, according to one embodiment.

FIG. 4 illustrates another exemplary series power distribution system, according to one embodiment. The system 400 includes the central controller 302 and a number N of serially connected nodes 401. Although FIG. 4 illustrates only one node 401$_N$, it is understood that the present system supports a series string of nodes 401 connected to the power bus 310. An exemplary node 401$_N$ includes a power control circuit 420$_N$, and the load 330$_N$. A control function 421$_N$ of the power control circuit 420$_N$ varies the operating point of a switched-mode power converter 422$_N$ based on a measured bus voltage across bus segments 310$_{N+1}$ and 310$_N$, a serial bus current $I_{BUS}$ sensed by the current sense means 324$_N$, and the transfer function coefficients received over the communication bus 340. The central controller 302 includes the central control function 303 that distributes a node-specific transfer function coefficient $K_N$ 441$_N$, a common scaling coefficient $K_{SCALE}$, 442, and a common synchronization signal SYNC 443 to the control function 421$_N$ of each node 401$_N$. The central controller 302 adjusts the values of the node-specific transfer function coefficients $K_{1 \ldots N}$ to maintain the desired power proportion for each node 401. The transfer function for an exemplary node 401$_N$ is as follows:

$$I_{NODE\_N} = V_{NODE\_N} * K_{SCALE}/K_N,$$

where $I_{NODE\_N}$ and $V_{NODE\_N}$ are the current through and voltage across the node 401$_N$ respectively. The synchronization signal 443 coordinates a distribution of the transfer function coefficients $K_{1 \ldots N}$ to the nodes 401.

Noise disturbance or other error conditions may cause $V_{NODE\_N}$ to vary. However, the transfer function realized at each node acts to restore $V_{NODE\_N}$ toward its nominal value. An increase in $V_{NODE\_N}$ increases $I_{BUS}$, resulting in increased bus current through other nodes 401 in the serial string. Due to the resistive transfer function of these other nodes 401, as voltage drop across each of the other nodes 401 increases, the increased voltage drop across other nodes decreases $V_{NODE\_N}$ back toward its original value. Conversely, a decrease in $V_{NODE\_N}$ decreases $I_{BUS}$ resulting in an increase in the value of $V_{NODE\_N}$. Stabilization feedback scales as the sum of $K_N$ divided by $K_N$.

The central control function 303 manipulates $K_{SCALE}$ responsive to the a bus power command $P_{COMMAND}$ received from the application 350 and a total bus voltage $V_{BUS}$. The application 350 determines the bus power command based on a requirement of the application 350. For example, in a rechargeable battery application where the charging current follows a predefined time profile, the rechargeable battery application periodically issues bus power commands that track the desired current profile. In another exemplary battery application where the battery absorbs energy from an electrodynamic machine such as during regenerative braking in a hybrid-electric vehicle, the bus power commands determine the power that the battery absorbs given the operating rules of the vehicle power management system and the charging policy of the battery management system. In another exemplary application where the serial power bus powers lighting, the bus power commands determine power to supply each light. In one embodiment, the application communicates individual power levels to each node. In another embodiment, the application communicates power proportions to each node, and a separate total power level. For an assumption of:

$$R_{SOURCE} \ll \left(\sum_{M=1}^{M=N} K_{(M)}\right) / K_{SCALE}$$

The bus power $P_{BUS}$ across the plurality of nodes 401 approximates:

$$P_{BUS} = V_{BUS}^2 * K_{SCALE} / \left(\sum_{M=1}^{M=N} K_{(M)}\right)$$

where power $P_{(N)}$ through an exemplary node $401_N$ is:

$$P_{(N)} = P_{BUS} * K_{(N)} / \left(\sum_{M=1}^{M=N} K_{(M)}\right)$$

Therefore, $K_{SCALE}$ may be estimated as:

$$K_{SCALE} = P_{COMMAND} * \left(\sum_{M=1}^{M=N} K_{(M)}\right) / V_{bus}^2$$

$K_{SCALE}$ may be adjusted by a combination of feed-forward and feedback techniques known to one ordinary skilled in the art, so as to track the bus power $P_{BUS}$ against the bus power command $P_{COMMAND}$. In a feed-forward arrangement, $K_{SCALE}$ may be computed based on the bus power command $P_{COMMAND}$, a sampled or presumed value of $V_{BUS}$, and the sum of the $K_N$ values. A feedback arrangement may provide sensing of $V_{BUS}$ and/or $I_{BUS}$ and iteratively adjust $K_{SCALE}$ using a proportional/integral control loop to drive the average measured value of bus power to match the bus power command over time. The present system generates and distributes $K_{SCALE}$ with sufficient bandwidth to meet the dynamic requirements of potentially fast-changing conditions of the application 350 and/or the bus power source (or load) 307 in FIG. 4. For example, the bus power source 307 may be an electrodynamic machine of a hybrid vehicle. The bus power $P_{BUS}$ of the hybrid vehicle may rapidly transition from sourcing during regenerative braking to sinking during subsequent vehicle acceleration. $K_{SCALE}$ may be distributed by any analog or digital communication means known to one ordinary skilled in the art, including but not limited to an analog distribution of a current loop value, a digital distribution of a pulse width modulation (PWM) or a pulse position modulation (PPM), and a message based command signal.

The power control circuit $420_N$ of each node $401_N$ includes a filter capacitor $C_{NODE}$ $323_N$ at the input to each node $401_N$ which creates a filter pole $\omega_0$ at:

$$\omega_0 = K_{SCALE} / (K_N \cdot C_{NODE})$$

The power control circuit $420_N$ at each node $401_N$ has an open-loop bandwidth of at least $\omega_0$ to maintain stable operation of the node $401_N$. Since $K_{SCALE}$ increases proportionally to bus power $P_{BUS}$, the product of control bandwidth and filter capacitance also scales with bus power. In real-world implementations, this constraint could prove onerous, as both higher control-loop bandwidth and higher capacitance increase costs.

According to one embodiment, the present system and method provide a means of serial power distribution that allows bus currents to vary over a wide range while maintaining stability and power proportioning capabilities. The present system and method splits bus power scaling from required control bandwidth by creating a transfer function at each node that manages current through each node as the sum of two separate current components.

Figure 5:
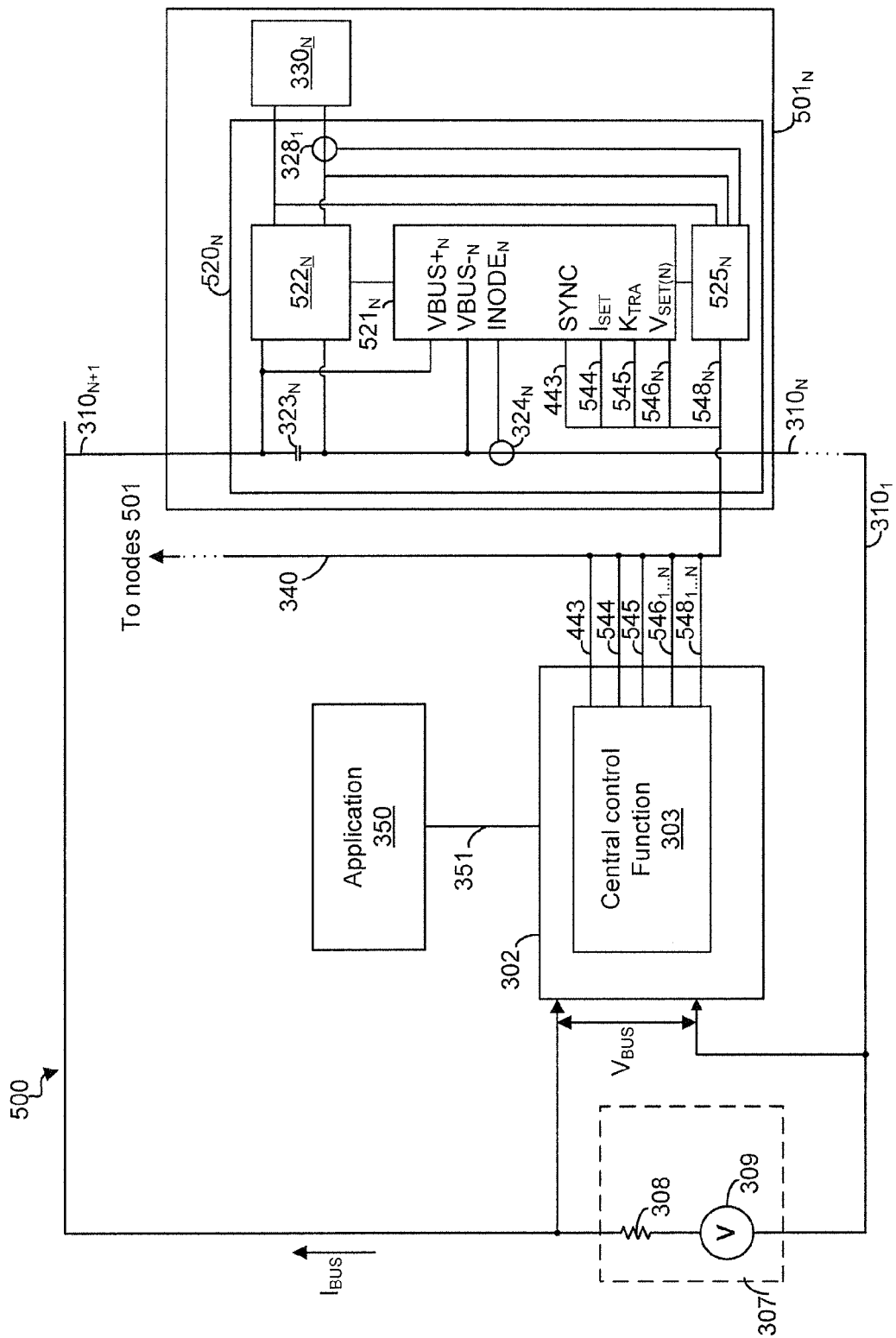
FIG. 5 illustrates another exemplary series power distribution system, according to one embodiment.

FIG. 5 illustrates another exemplary series power distribution system, according to one embodiment. The power control circuit $520_N$ executes a transfer function within each node $501_N$ that sums two current components. The system 500 includes the central controller 302 and a number N of serially connected nodes 501. Although FIG. 5 illustrates only one node $501_N$, it is understood that the present system supports a series string of nodes 501. An exemplary node $501_N$ includes a power control circuit $520_N$, and the load $330_N$. A control function $521_N$ of the power control circuit $520_N$ varies the operating point of a switched-mode power converter $522_N$ based on a measured bus voltage across bus segments $310_{N+1}$ and $310_N$, a serial bus current $I_{BUS}$ sensed by the current sense means $324_N$, and the transfer function coefficients received over the communication bus 340. The control function $521_N$ reports bus voltage and current to a measurement function $525_N$ in the power control circuit $520_N$. The measurement function $525_N$ performs signal processing on bus-side and load side voltage and current measurements and reports the processed measurements $548_N$ to the central power control function 303 via the communication means 340. A bus power source 307 including a voltage source 309 ($V_{SOURCE}$), and an internal resistance 308 ($R_{SOURCE}$) delivers power to nodes 501 via a power bus 310. In another embodiment, the bus power source 307 may be a bus power sink that absorbs power supplied by nodes 501 via the power bus 310. The application 350 communicates a bus power command $P_{COMMAND}$ for each node $501_N$ to the central controller 302 via the communication bus 351. In one embodiment, the application 350 communicates the bus power command $P_{COMMAND}$ for each node $501_N$ as an absolute value. In another embodiment, the application 350 communicates a total bus power command and communicates the bus power command $P_{COMMAND}$ for each node $501_N$ as a fraction of the total bus power command. The central controller 302 communicates three coefficients to the node power control $520_N$ of an exemplary node $501_N$, and a common synchronization signal 443 to all the nodes 501:

A first current coefficient $I_{SET}$ 544 common to all nodes 501

A transresistance transfer function coefficient $K_{TRA}$ 545 common to all nodes 501

A node-specific voltage transfer function coefficient $V_{SET(N)}$ $546_N$ $K_{TRA}$ and $V_{SET(N)}$ together with the node terminal voltage establish a second current component with a transiently node-specific current $I_{COMPLIANT}$.

The central controller 302 distributes values for each of the three coefficients $I_{SET}$544, $K_{TRA}$ 545, and $V_{SET(N)}$ $546_N$ to each node $501_N$. According to one embodiment, the central controller 302 determines the coefficient $I_{SET}$ based on the sum of the bus power command $P_{COMMAND}$ conveyed by the communication bus 351 and the total bus voltage $V_{BUS}$. In another embodiment, where power flows from the bus 310 to the nodes 501, the central controller 302 further determines the coefficients $V_{SET(N)}$ based on a minimum given value of $V_{BUS}$, the number of nodes and the power apportionment to each node $501_N$. In another embodiment, the central controller 302 further determines the coefficient $K_{TRA}$ based on the minimum and maximum given values of $V_{BUS}$, the performance characteristic limits of the loads 330, the design of the switched-mode power converters 522 and the operating state of the power bus. The minimum and maximum given values of $V_{BUS}$ may be based on assumed voltage values, or specified voltage ratings.

In one embodiment, the DC transfer function for an exemplary node $\mathbf{501}_N$ is:

$$I_{NODE(N)} = I_{SET} + I_{COMPLIANT(N)}$$

$$I_{COMPLIANT(N)} = (V_{NODE(N)} - V_{SET(N)})/(V_{SET(N)} * K_{TRA})$$

where $I_{NODE(N)}$ and $V_{NODE(N)}$ are the current through and bus voltage drop across the node $\mathbf{501}_N$ respectively. The synchronization signal 443 coordinates a distribution of coefficients to the nodes 501.

When delivering power to nodes, as long as $V_{BUS}$ is greater than the sum of $V_{SET(N)}$, i.e., $V_{BUS} \geq \text{sum}(V_{SET(N)})$, all the nodes 501 draw power for all positive values of $I_{SET}$. Furthermore, the voltage across each node $\mathbf{501}_N$, and power through each node $\mathbf{501}_N$ stabilizes at a value proportional to $V_{SET(N)}$. For aggregate bus voltages less than the sum of $V_{SET(N)}$ values, as long as $I_{SET} * K_{TRA} > 1.0$, the voltage across each node $\mathbf{501}_N$ remains positive and also proportions to the value of $V_{SET(N)}$. If neither condition $V_{BUS} \geq \text{sum}(V_{SET(N)})$ nor $I_{SET} * K_{TRA} > 1.0$, is satisfied, then power flow reverses through one or more nodes. Conversely, when nodes power the bus, so long as either $\text{sum}(V_{SET(N)}) \geq V_{BUS}$, or $I_{SET} * K_{TRA} \leq -1.0$, then all nodes supply power to the bus proportional to $V_{SET(N)}$.

The total steady-state bus current $I_{BUS}$ through each node $\mathbf{501}_N$ includes the two components: common bus current $I_{SET}$ and transiently node-specific current $I_{COMPLIANT}$. Under ideal conditions, since $I_{SET}$ for all nodes 501 is equal and total bus current through each node $\mathbf{501}_N$ is equal, the transiently node-specific current $I_{COMPLIANT}$ through each node $\mathbf{501}_N$ is also equal:

$$I_{BUS} = I_{SET} + I_{COMPLIANT}$$

$$I_{BUS} = I_{SET} + \left(V_{BUS} - \sum_{M=1}^{M=N} V_{SET(M)}\right) \bigg/ \left(K_{TRA} * \sum_{M=1}^{M=N} V_{SET(M)}\right)$$

where $V_{BUS}$ is the voltage across all the nodes 501 and $$I_{COMPLIANT} = \left(V_{BUS} - \sum_{M=1}^{M=N} V_{SET(M)}\right) \bigg/ \left(K_{TRA} * \sum_{M=1}^{M=N} V_{SET(M)}\right)$$

The voltage across an exemplary node $\mathbf{501}_N$ is:

$$V_{NODE(N)} = V_{SET(N)} * (1 + I_{COMPLIANT} * K_{TRA})$$

$$V_{NODE(N)} = V_{BUS} * V_{SET(N)} \bigg/ \sum_{M=1}^{M=N} V_{SET(M)}$$

Although voltage drop across the nodes 501 varies with dynamic changes in $V_{BUS}$, the bus contribution voltage $V_{NODE(N)}$ of each node $\mathbf{501}_N$ tracks proportionally to the $V_{SET(N)}$ coefficient issued by the central controller 302. Since steady-state bus current is equal for all nodes 501, steady-state power exchanged between the bus 310 and each node $\mathbf{501}_N$ also proportionally tracks $V_{SET(N)}$.

The filter capacitor $C_{NODE}$ $\mathbf{323}_N$ at the input to each node $\mathbf{501}_N$ creates a filter pole $\omega_{0(N)}$ at:

$$\omega_{0(N)} = 1/(V_{SET(N)} * K_{TRA} * C_{NODE})$$

The power control circuit $\mathbf{520}_N$ at each node $\mathbf{501}_N$ must have an open-loop bandwidth of at least $\omega_0$ to maintain stable operation of the node $\mathbf{501}_N$.

For any given power handling capacity, the product $V_{SET(N)} * K_{TRA}$ is much greater than the quotient $K_{(N)}/K_{SCALE}$ used in the single current component embodiment previously described in FIG. 4. Therefore, at any given bus power, the required product of control bandwidth and filter capacitance $C_{NODE}$ of the two-current-component embodiment is made smaller than the one used in the single current component embodiment, allowing for lower cost and physical size.

The upper bound on $K_{TRA}$, is determined by an allowable node voltage error and therefore a power proportion error, and the precision with which the nodes 501 can track $I_{SET}$ commands relative to one another. Smaller values of $K_{TRA}$ correspond to smaller proportioning errors for a given $I_{SET}$ error. However, smaller values of $K_{TRA}$ also increases $\omega_{0(N)}$. The value of $K_{TRA}$ is therefore a design compromise.

Figure 6:
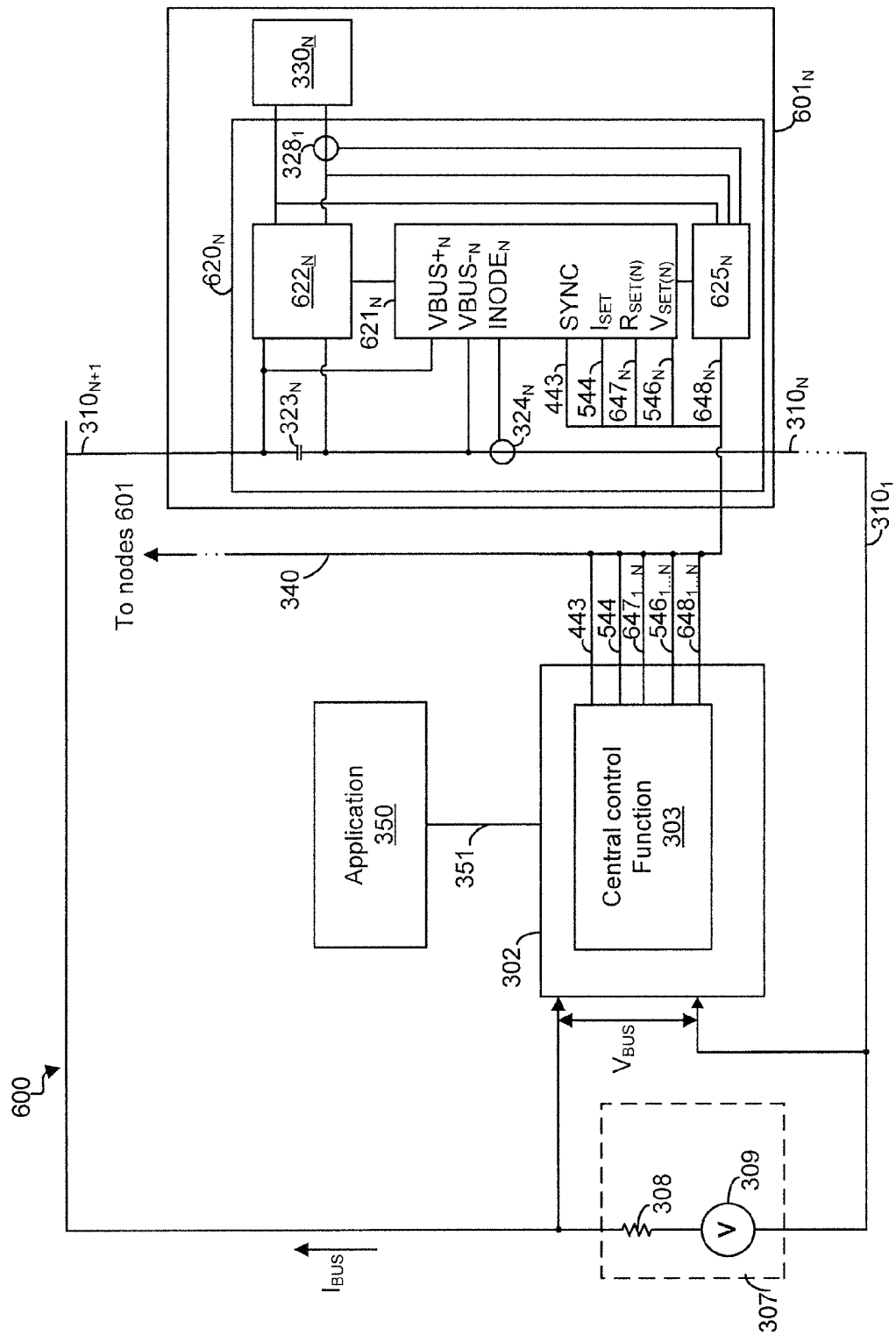
FIG. 6 illustrates another exemplary series power distribution system, according to one embodiment.

FIG. 6 illustrates another exemplary series power distribution system, according to one embodiment. The system 600 includes the central controller 302 and a number N of serially connected nodes 601. Although FIG. 6 illustrates only one node $\mathbf{601}_N$, it is understood that the present system supports a series string of nodes 601. An exemplary node $\mathbf{601}_N$ includes a power control circuit $\mathbf{620}_N$, and the load $\mathbf{330}_N$. A control function $\mathbf{621}_N$ of the power control circuit $\mathbf{620}_N$ varies the operating point of a switched-mode power converter $\mathbf{622}_N$ based on a measured bus voltage across bus segments $\mathbf{310}_{N+1}$ and $\mathbf{310}_N$, a serial bus current $I_{Bus}$ sensed by the current sense means $\mathbf{324}_N$, and the transfer function coefficients received over the communication bus 340. The control function $\mathbf{621}_N$ reports bus voltage and current to a measurement function $\mathbf{625}_N$ in the power control circuit $\mathbf{620}_N$. The measurement function $\mathbf{625}_N$ performs signal processing on bus-side and load side voltage and current measurements and reports the processed measurements $\mathbf{648}_N$ to the central power control function 303 via the communication means 340. In this case, the central power control function 303 distributes a node-specific resistance coefficient $R_{SET(N)}$ $\mathbf{647}_N$ to each node $\mathbf{601}_N$, where:

$$R_{SET(N)} = V_{SET(N)} * K_{TRA}.$$

The transfer function at each node $\mathbf{601}_N$ is algebraically equivalent to the transfer function at each node $\mathbf{601}_N$ as illustrated in FIG. 5:

$$I_{NODE(N)} = I_{SET} + I_{COMPLIANT(N)}$$

$$I_{COMPLIANT(N)} = (V_{NODE(N)} - V_{SET(N)})/R_{SET(N)}$$

In one embodiment, the central control function 303 provides a control means to adjust $V_{SET(N)}$ based on the time averaged difference at each node $\mathbf{601}_N$ between assigned and measured energy delivery proportions as illustrated in FIG. 5. In another embodiment, the central control function 303 provides a control means to adjust $V_{SET(N)}$ and $R_{SET(N)}$ based on the time averaged difference at each node $\mathbf{601}_N$ between assigned and measured energy delivery proportions, as illustrated in FIG. 6. In another embodiment, the central control function 303 provides a control means to determine gain and offset error of node by node $I_{SET}$ command tracking based on time averaged values of measured voltage distribution across all nodes 601, bus current, $I_{SET}$ commands, and $V_{SET(1)\ldots(N)}$ commands. The central control function 303 communicates corrective gain and offset coefficients to each node $601_N$.

Figure 7:
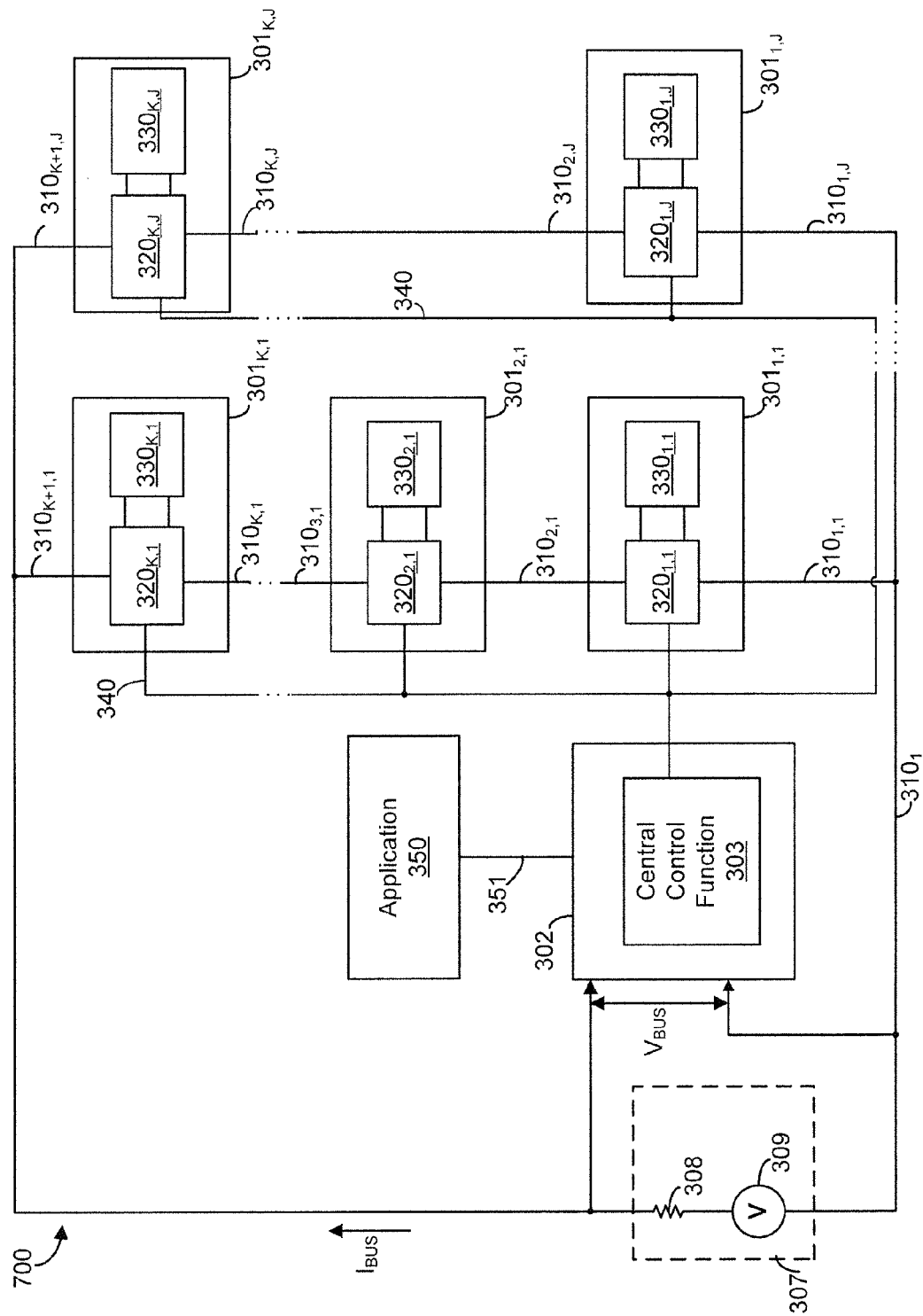
FIG. 7 illustrates an exemplary parallel power distribution system, according to one embodiment.

FIG. 7 illustrates an exemplary parallel power distribution system, according to one embodiment. The system 700 includes a plurality of series strings of nodes (e.g., $310_{1,J}\ldots 310_{K,J}$). Each series string is electrically connected in parallel to a bus power source (or sink) 307. FIG. 7 illustrates that there are J number of series strings of nodes. According to one embodiment, the number of nodes in each series string may be different. According to another embodiment, nodes of a plurality of nodes are electrically connected in parallel.

The power control circuit $320_{K,J}$ of a Kth node of a Jth series string executes a transfer function $$INODE_{K,J} = ISET_J + (VNODE_{K,J} - VSET_{K,J})/(KTRA_J * VSET_{K,J})$$

where $INODE_{K,J}$ is the bus current through the node $301_{K,J}$, and $VNODE_{K,J}$ is the bus voltage across node $301_{K,J}$. The central power control function 303 may distribute transfer function coefficients $ISET_J$, $VSET_{K,J}$, and $KTRA_J$ via the communication bus 340 to each node $301_{K,J}$. According to one embodiment, the central controller 302 sends the transfer function coefficients to a subcontroller (not shown) for a series string, and the subcontroller relays the commands to each node in that particular series string.

According to one embodiment, the application 350 commands a fraction $PTOTAL\_FRAC_J$ of the aggregate bus power that is to be on the bus of the Jth series string, and, the fraction $PSTRING\_FRAC_{K,J}$ of the bus power on the Jth series string to be supplied or received by the Kth node of the Jth series string. Therefore, the Kth node on the Jth series string supplies or receives a fraction $PSTRING\_FRAC_{K,J} * PTOTAL\_FRAC_J$ of the aggregate bus power.

In one embodiment, the nodes may power a plurality of lights, and the power proportions correspond to a desired brightness of each light relative to the brightness for the plurality of lights. In another embodiment, the nodes may be connected to electrochemical cells, and the power proportions correspond to a desired load or charge applied to each electrochecmical cell according to a cell-by-cell battery management policy. In another embodiment, the nodes may be connected to laboratory power supplies with different maximum power ratings, and the power proportions are set according to the relative power rating of each supply.

According to one embodiment, the central controller 302 determines a desired sum total of the $ISET_J$ coefficients through the J number of series strings, ISET_TOTAL, according to the bus power command determined by the application 350. The central controller 302 computes the current transfer function coefficient, $ISET_J$, for all the nodes in the Jth series string as follows:

$$ISET_J = PTOTAL\_FRAC_J * ISET\_TOTAL$$

Since $$\Sigma_{J=1}^{M} PTOTAL\_FRAC_J = 1,$$

this ensures that $\Sigma_{J=1}^{M} ISET_J = ISET\_TOTAL$

According to one embodiment, the central controller 302 determines the desired total value of the $VSET_{K,J}$ coefficients in each series string, VSET_TOTAL. Each series string provides a common VSET_TOTAL value. In one embodiment, the nodes 301 receive power from the bus power source 307, and the central controller 302 sets the VSET_TOTAL value to be less than the minimum expected value of $V_{BUS}$. In another embodiment, the nodes deliver power to the bus power sink 307, and the central controller 302 sets the VSET_TOTAL value to be greater than the maximum expected value of $V_{BUS}$. The central controller 302 computes a node-specific voltage transfer function coefficient for each node $301_{K,J}$ using $$VSET_{K,J} = PSTRING\_FRAC_{K,J} * VSET\_TOTAL$$

The central controller 302 further computes a transresistance coefficient, $KTRA_J$, for the Jth series string:

$$KTRA_J = KTRA\_MIN * \max_J(ISET_J)/ISET_J$$

where KTRA_MIN is the minimum allowed value of KTRA according to the power converter control loop bandwidth and bus capacitor value, and $KTRA_J$ is the largest of all the $ISET_J$ values. This ensures that all $KTRA_J$ values are greater than the minimum allowed $KTRA_J$ value, and that each $KTRA_J$ value is inversely proportional to the corresponding $ISET_J$ value. $KTRA_J$ is common to all nodes in the Jth series string.

According to one embodiment, the central controller 302 distributes $KTRA_J$ via the communication bus 340 to all the nodes $301_{1,J}\ldots_{K,J}$ within the Jth series string. According to another embodiment, the central controller 302 computes and distributes a node-specific resistance transfer function coefficient $RSET_{K,J}$ to each node $301_{K,J}$ based on the following equation:

$$RSET_{K,J} = VSET_{K,J} * KTRA_J$$

Under steady state conditions, the bus current $IBUS_J$ through the Jth series string may be determined as follows:

$$IBUS_J = ISET_J + \frac{VBUS - VSET\_TOTAL}{KTRA_J * VSET\_TOTAL}$$

$$= ISET_J \left(1 + \frac{VBUS - VSET\_TOTAL}{KTRA\_MIN * \max_J(ISET_J) * VSET\_TOTAL}\right)$$

Since VBUS, VSET_TOTAL, $\max_J$ ($ISET_J$), and KTRA_MIN are all common to all the nodes 301, $IBUS_J$ always stabilizes to a value proportional to the assigned $ISET_J$ value. In other words, the proportion of the total current and power across each series string is $ISET_J/ISET\_TOTAL$, which is equal to PTOTAL_FRAC_K. The central controller 302 distributes the following transfer function coefficients:

The current transfer function coefficient $ISET_J$ common to all nodes in the Jth series string The node-specific voltage transfer function coefficient $VSET_{K,J}$ The transresistance coefficient $KTRA_J$ common to all nodes in the Jth series string The voltage $VNODE_{K,J}$ across a node $301_{K,J}$ is:

$$VNODE_{K,J} = VBUS * VSET_{K,J}/VSET\_TOTAL$$

$$= VBUS * PSTRING\_FRAC_{K,J}$$

and therefore the fraction of the bus power of the Jth series string delivered to or supplied by Nth node will be PSTRING_FRAC_K as long as the previously disclosed conditions on VBUS, VSET_TOTAL, $ISET_J$, and $KTRA_J$ are met.

According to one embodiment, the central controller 302 dynamically assigns the desired power proportions to each node $301_{K,J}$ to meet the power proportioning demands of the application 350. The central controller 302 may further adjust the assigned power proportioning to each series string independently of the assigned power proportioning to individual nodes 301.

According to another embodiment, the application 350 specifies the absolute power to be delivered to or supplied by each node $301_{K,J}$. The central controller 302 measures $V_{BUS}$ and computes and distributes the transfer function coefficients to each node $301_{K,J}$ so that the nodes 301 source or sink a total specified power, and the specified power is distributed among the nodes in the assigned proportions.

According to one embodiment, this present system and method dynamically assign power proportioning to a plurality of nodes electrically connected in arbitrary series and parallel strings based on a selection of transfer function coefficients. According to one embodiment, all the nodes are configured to execute the same algebraic form of a transfer function, with the transfer function coefficients provided by the central controller 302. Therefore, the nodes can be arbitrarily electrically connected in series and/or parallel to operate as desired without modification of the nodes. The central controller 302 distributes the transfer function coefficients to a node based on the electrical connections between the node and other nodes of the present system. The present system is thus highly scalable and easily reconfigurable depending on the voltage and current requirements of different bus power sources or sinks.

According to one embodiment, the system 700 includes a communication bus 340 between the central control function 303 and the nodes 301 to control and establish a closely time synchronized common $I_{SET}$ value for all nodes 301. The communication bus 340 between the central control function 303 and the nodes 301 includes various analog and digital means for communicating synchronized values across a network known to one ordinary skilled in the art. In one embodiment, the central control function 303 transmits an analog current proportional to the desired $I_{SET}$ through the nodes 301 to each power control circuit $320_N$. In another embodiment, the central control function 303 encodes $I_{SET}$ as the pulse-width of a fixed frequency pulse stream and synchronizes the $I_{SET}$ value across the nodes 301 upon the leading edge of each pulse. In another embodiment, the central control function 303 encodes $I_{SET}$ according to the pulse frequency of a variable frequency pulse stream and synchronizes the $I_{SET}$ value update across the nodes 301 upon the leading edge of each pulse. In another embodiment, the central control function 303 encodes $I_{SET}$ into the amplitude and/or phase of a pulse stream transmitted to the nodes 301 and synchronizes the $I_{SET}$ value update across the nodes 301 upon the leading edge of each pulse.

Referring to FIGS. 3(*a*)-3(*b*), the central control function 303 communicates $I_{SET}$ through a message-based digital communication bus. The control function $321_N$ of each node $301_N$ includes a series of digital buffer registers that include the following values:

1. the set-point at the present moment, R_ISET_POINT_BUS_PRES
2. the previously commanded set-point value, R_ISET_POINT_BUS_PRV
3. a target set-point that the node moves toward, R_ISET_POINT_BUS_TGT
4. a commanded set-point that the node next moves toward, R_ISET_POINT_BUS_NXT The control function $321_N$ of each node $301_N$ ramps between $I_{SET}$ values in a synchronized manner. The central control function 303 changes the $I_{SET}$ value by sending a message to all nodes 301 that contains the next $I_{SET}$ value that the nodes 301 are to move towards, R_ISET_POINT_BUS_NXT. The control function $321_N$ within each node $301_N$ stores the command value in R_ISET_POINT_BUS_NXT. When the central control function 303 confirms that all nodes 301 have received R_ISET_POINT_BUS_NXT, the central control function 303 simultaneously transmits an execution command to all nodes 301. The central control function 303 may transmit the execution command over the same messaging transport mechanism as the command values. According to one embodiment, the central control function 303 transmits the execution command through a dedicated communication means by way of a signal pulse.

The control function $321_N$ of each node $301_N$ responds to the execution command by shifting the contents of present and previous set point registers. The contents of the set-point at the present moment transfer to the previously commanded set-point value (i.e., R_ISET_POINT_BUS_PRES transfers to R_ISET_POINT_BUS_PRV). The contents of a commanded set-point that the node would next move toward transfers to a target set-point that the node immediately moves toward (i.e., R_ISET_POINT_BUS_NXT transfers to R_ISET_POINT_BUS_TGT). The node control function $321_N$ then initiates a proportionally timed transition between the previous target current value contained in R_ISET_POINT_BUS_PRV and the target current value contained in R_ISET_POINT_BUS_TGT by stepping R_ISET_POINT_BUS_PRES between each successive step value on a timed schedule. The transitions operate at rates that limit charge error accumulation/deficit at each node 301, and consequently proportioned voltage error at each node 301 within desired limits.

Figure 8:
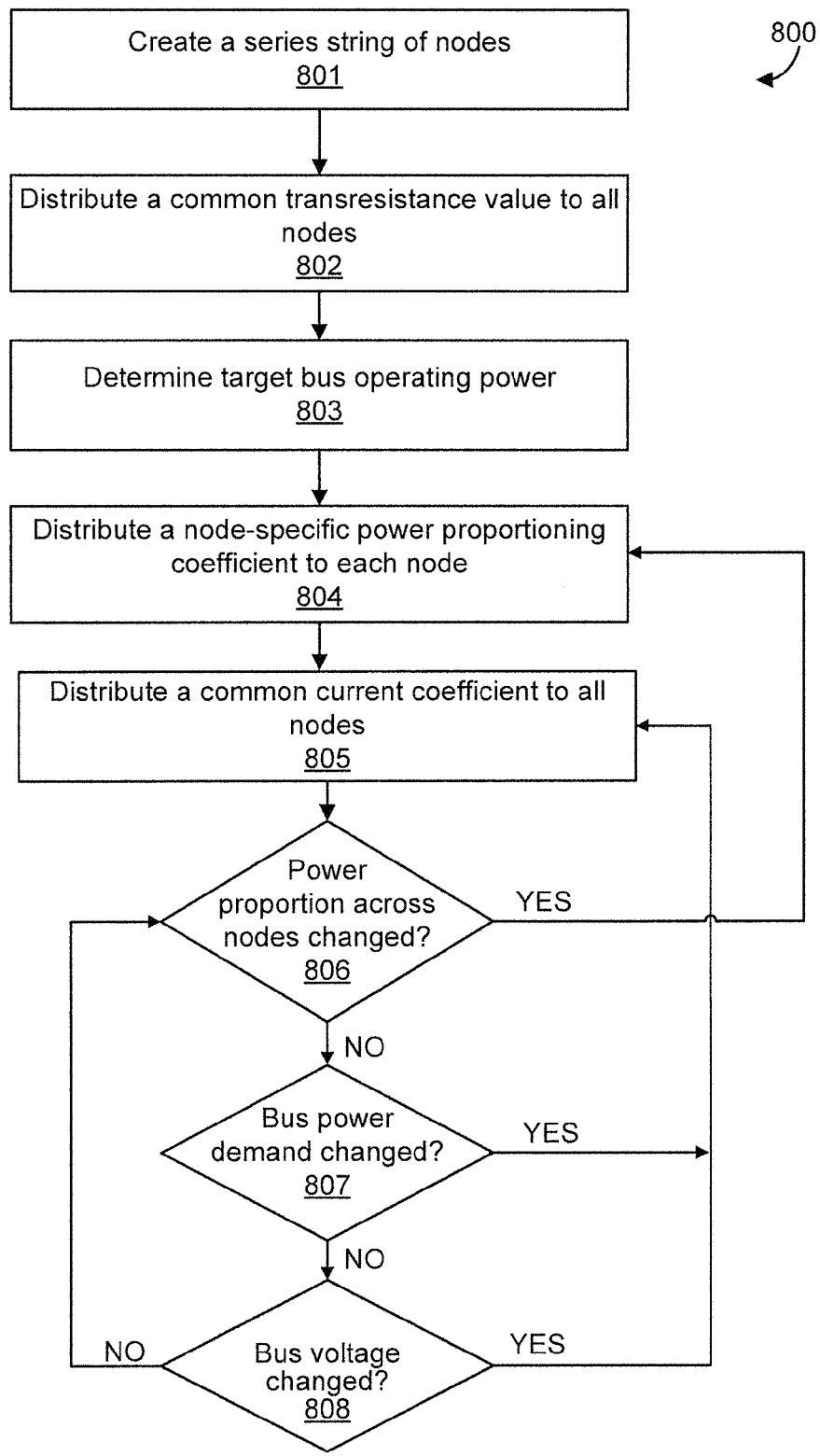
FIG. 8 illustrates a flow diagram of an exemplary process of distributing proportioned power values to each node in a series string of nodes, according to one embodiment.

FIG. 8 illustrates a flow diagram of an exemplary process of distributing proportioned power values to each node in a series string of nodes, according to one embodiment. The process 800 begins with creating a series string of nodes electrically connected to a power distribution bus at 801. Referring to FIG. 3(*a*), the central control function 303 delivers power from a power source 307 via the power bus 310 to the series string of nodes 301 or delivers power from the nodes 301 to a power sink 307 via the power bus 310. The present system determines and distributes a common transresistance coefficient to all the nodes at 802. The present system determines a target bus operating power as the sum of power values demanded by an external application for all nodes at 803. The present system distributes a node-specific power proportioning coefficient to each node at 804. Referring to FIG. 3(*a*), the central control function 303 distributes a power-proportioning coefficient as a node-specific voltage coefficient to each node $301_N$ that receives power, where the node-specific voltage coefficient corresponds to the node voltage at a minimum given bus voltage under conditions of zero or near zero bus current. In another embodiment, the central control function 303 distributes a power-proportioning coefficient as a node-specific voltage coefficient to each node $301_N$, with each node $301_N$ supplying power, where the node-specific voltage coefficient corresponds to node voltage at a maximum given bus voltage under conditions of zero or near zero bus current. Based on the bus voltage and total bus power demand, the present system distributes a common current coefficient to all nodes at 805. At 806 the present system determines if there is a change in the power proportion across the nodes. If there is a change in the power proportions, the present system returns to distribute a node-specific power proportioning coefficient to each node at 804. If there is no change in the power proportions, the present system determines if there is a change in the total bus power demand at 807. If there is a change in the total bus power demand, the present system returns to distribute a common current coefficient to all the nodes at 805. If there is no change in the total bus power demand, the present system determines if there is a change in the bus voltage at 808. If there is a change in bus voltage, the present system returns to distribute a common current coefficient to all the nodes at 805. If there is no change in the bus voltage, the present system returns to determining if the power proportioning across the node has changed at 806. Referring to FIG. 3(*a*), the system 300 regulates power transferred between the power bus 310 and the nodes 301.

According to one embodiment, the central control function 303 distributes common and node-specific coefficients to digital buffer registers in the control means 321$_N$ of each node through the communication bus 340.

According to one embodiment, the central control function 303 adjusts node-specific power proportions according to bus power demand, bus voltage, and tabulated operating point efficiencies of the switched-mode power converters 322$_N$ of each node 301$_N$.

According to one embodiment, the central control function 303 adjusts node-specific power proportions responsive to application 350 power demands, and measured load power reported by node measurement circuits 325$_N$ of each node 301$_N$.

According to one embodiment, the power control function 321$_N$ of each node 301$_N$ determines a total bus current demand as the sum of a first common current component $I_{SET}$ transmitted and a second node-specific current component $I_{COMPLIANT}$. The power control function 321$_N$ determines $I_{COMPLIANT}$ based on a common transresistance coefficient, $K_{TRA}$, and a node-specific power proportioning coefficient, $V_{SET(N)}$.

$$I_{BUS(N)} = I_{SET} + (V_{NODE(N)} - V_{SET(N)})/(K_{TRA} * V_{SET(N)})$$

According to one embodiment, the power control function 321$_N$ of each node 301$_N$ derives a peak power converter current value as the sum of the bus current and the difference between a cycle-to-cycle average current and a peak current in the switched-mode power converter 322$_N$. The power control function 321$_N$ transmits this derived current value as the peak bus operating current of switched-mode power converter 322$_N$.

According to one embodiment, a transfer function for a node can be expressed in terms of the bus-side voltage:

$$V_{NODE(N)} = V_{SET(N)} + (I_{BUS(N)} - I_{SET}) * K_{TRA} * V_{SET(N)}$$

According to one embodiment, the power control function 321$_N$ computes $V_{NODE(N)}$, and transmits it as a reference voltage to a voltage error amplifier that controls the switched-mode power converter 322$_N$.

Figure 9A:
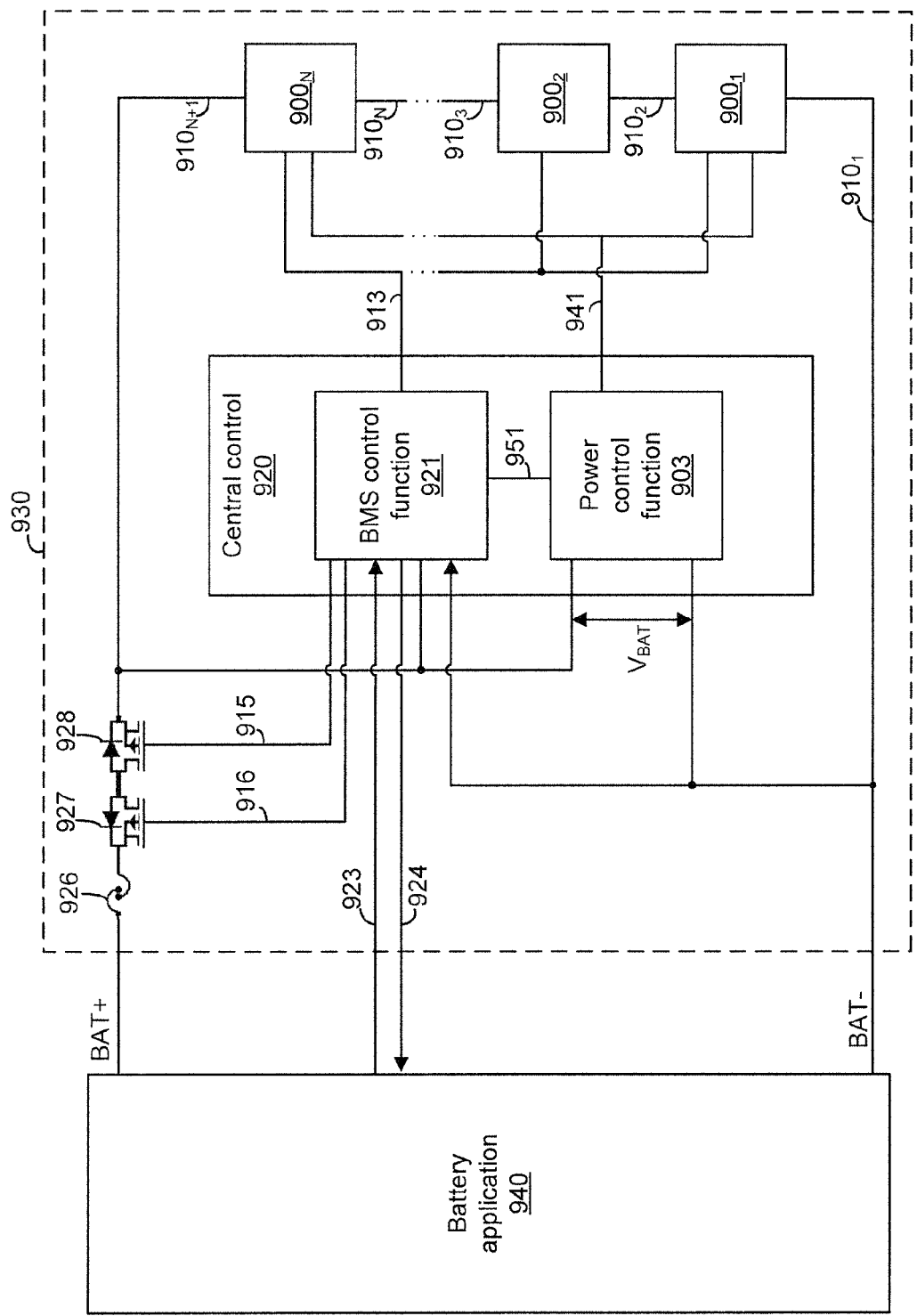
FIG. 9(a) illustrates a diagram of an exemplary multi-cell serial energy storage pack, according to one embodiment.
Figure 9B:
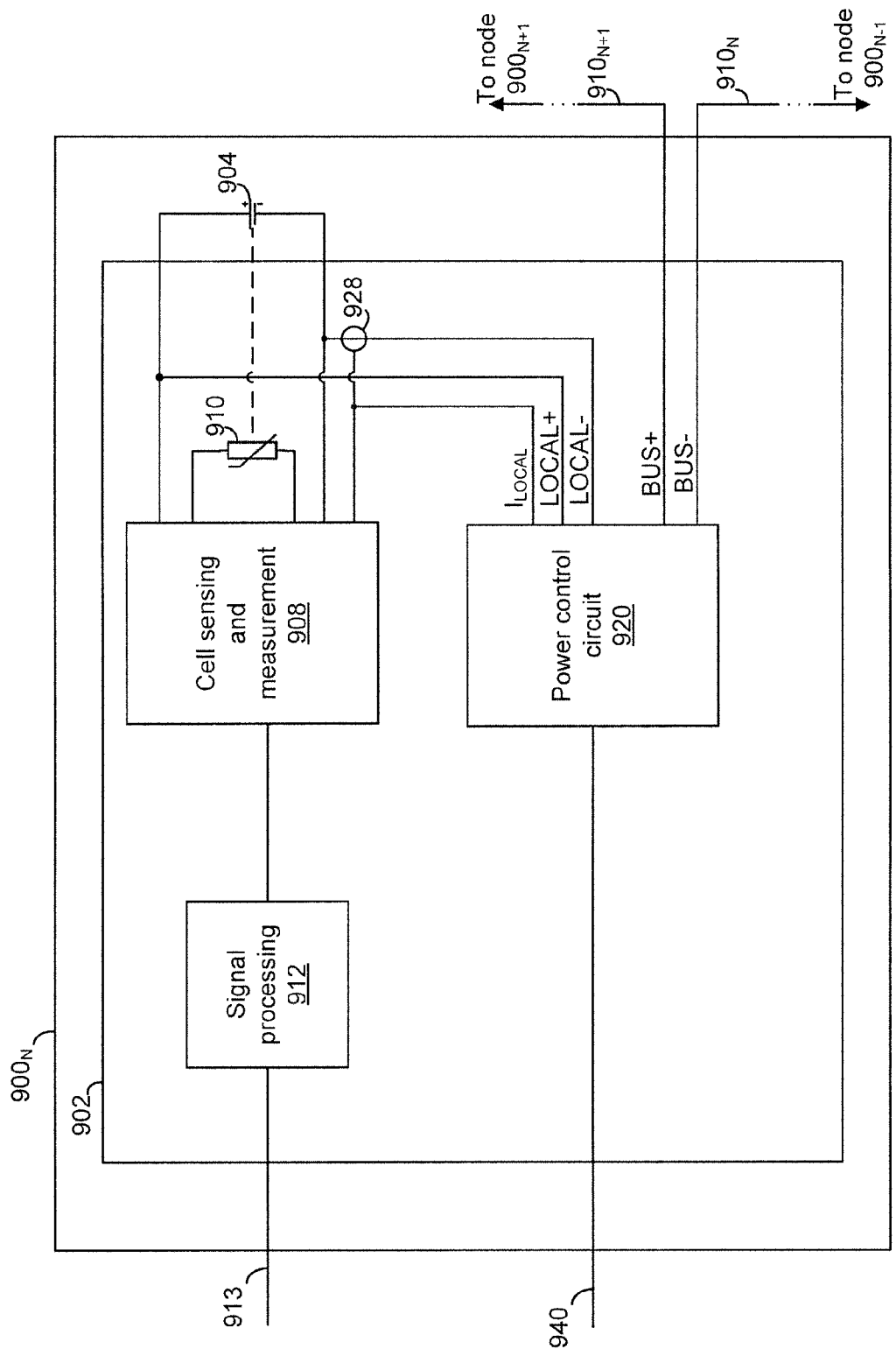
FIG. 9(b) illustrates a diagram of an exemplary energy storage node, according to one embodiment.

FIG. 9(*a*) illustrates a diagram of an exemplary multi-cell energy storage pack, according to one embodiment. A storage pack 930 includes external power terminals BAT+ and BAT−. The storage pack 930 includes an overcurrent protection component 926, a series charge switch 927, a series discharge switch 928, a central control 920 and a plurality of nodes 900 connected serially through a power bus 910, measurement communication bus 913, a power control bus 941, an application command bus 923, and application status bus 924.

The central control 920 includes a battery management system (BMS) control function 921, and a power control function 903. The BMS control function 921 receives information from the nodes 900 over a communication bus 913. The BMS control function 921 also receives battery control commands from a battery application 940 over a communication bus 923. The BMS control function 921 reports a status of the storage pack 930 to the battery application 940 over a communications link 924. The BMS control function 921 closes the series charge switch 927 via a control signal 916 during a charge operation. The BMS control function 921 closes the series discharge switch 928 via a control signal 915 during a discharge operation. The BMS control function 921 determine a power to deliver to each of the nodes 900 during a charging operation, and a power to deliver to the battery application 940 from each of the nodes 900 during a discharge operation based on stored load policy information, stored cell characteristics, cell measurement information received from the nodes 900, and battery application commands from the battery application 940. The BMS control function 921 communicates node power levels to the central power control function 903 over a communications means 951. According to one embodiment, the BMS control function 921 provides a total power demand and individual node power proportions to the power control function 903.

In one embodiment, the power control function 903 computes common and node-specific operating coefficients based on stored information, power demand information received from the BMS control function 921 via the communication means 951 and a battery stack voltage $V_{BAT}$. In one embodiment, the power control function 903 adjusts the operating coefficients based on measured cell voltage and current reported by a node power-control measurement function (not shown) of each node 900$_N$ such that the time averaged measured power exchanged with a storage cell (not shown) of each node 900$_N$ converges with the time averaged power commands received from the BMS control function 921. FIG. 3(*b*) illustrates a node power control measurement function 325 in a node. FIG. 9(*b*) below illustrates a storage cell 904 in a node. The power control function 903 distributes power control coefficients and synchronization timing to nodes 900 via the power control bus 941. According to one embodiment, the power control coefficients include a transresistance coefficient $K_{TRA}$ common to all nodes, a current coefficient $I_{SET}$ common to all nodes, and a voltage coefficients $V_{SET(N)}$ to each node 900. In one embodiment, the power control function 903 updates the common current coefficient $I_{SET}$ at a rate of two hundred samples per second.

FIG. 9(*b*) illustrates a diagram of an exemplary energy storage node, according to one embodiment. The node 900$_N$ includes a control circuit 902 that is electrically connected to an energy storage cell 904.

The positive and negative terminals of the energy storage cell 904 connect to a power control circuit 920 and a cell sensing and measurement component 908 of the control circuit 902. A temperature sensor 910 thermally couples to the energy storage cell 904 and connects to a cell sensing and measurement function 908. A cell current sense means 928 connects both to the cell sensing and measurement function 908 and the power control circuit 920. The cell sensing and measurement function 908 determine properties of the energy storage cell 904, including but not limited to, historical cell characteristics, cell degradation characteristics, cell performance characteristics, and predicted cell performance characteristics. In one embodiment, the power control circuit 920 includes the cell current sense means 928. The power control circuit 920 of the node 900$_N$ connects to the power bus segments 910$_N$ and 910$_{N+1}$. The power control circuit 920 receives transfer function coefficients and synchronization signals from the central power control function 303 via the communication bus 340. In one embodiment, the communication bus 913 and the communication bus 340 share physical layer communications. The node 900$_N$ further includes a signal processing block 912 that manipulates measured cell characteristics for transmission to the BMS control function 921 via the communication bus 913.

As in the various embodiments illustrated herein, the present system and method can be implemented with a central controller. According to another embodiment, the function of the central controller can be implemented as a distributed processing system. Such a distributed processing system may be embedded as software in the control circuits of the nodes of a plurality of nodes. Each node communicates its measured electrical characteristics to other nodes of the plurality of nodes, thus enabling each node to set and adjust its own assigned electrical characteristic (e.g., an assigned proportion of an aggregate power across the plurality of nodes). According to another embodiment, the present system includes a combination of a central controller and a distributed processing system that is embedded as software in the control circuits of the nodes, where the combination provides communication of measured electrical characteristics between the nodes and the central controller to maintain an assigned electrical characteristic to each node. Such variations are within the scope of the present subject matter.

Figure 10:
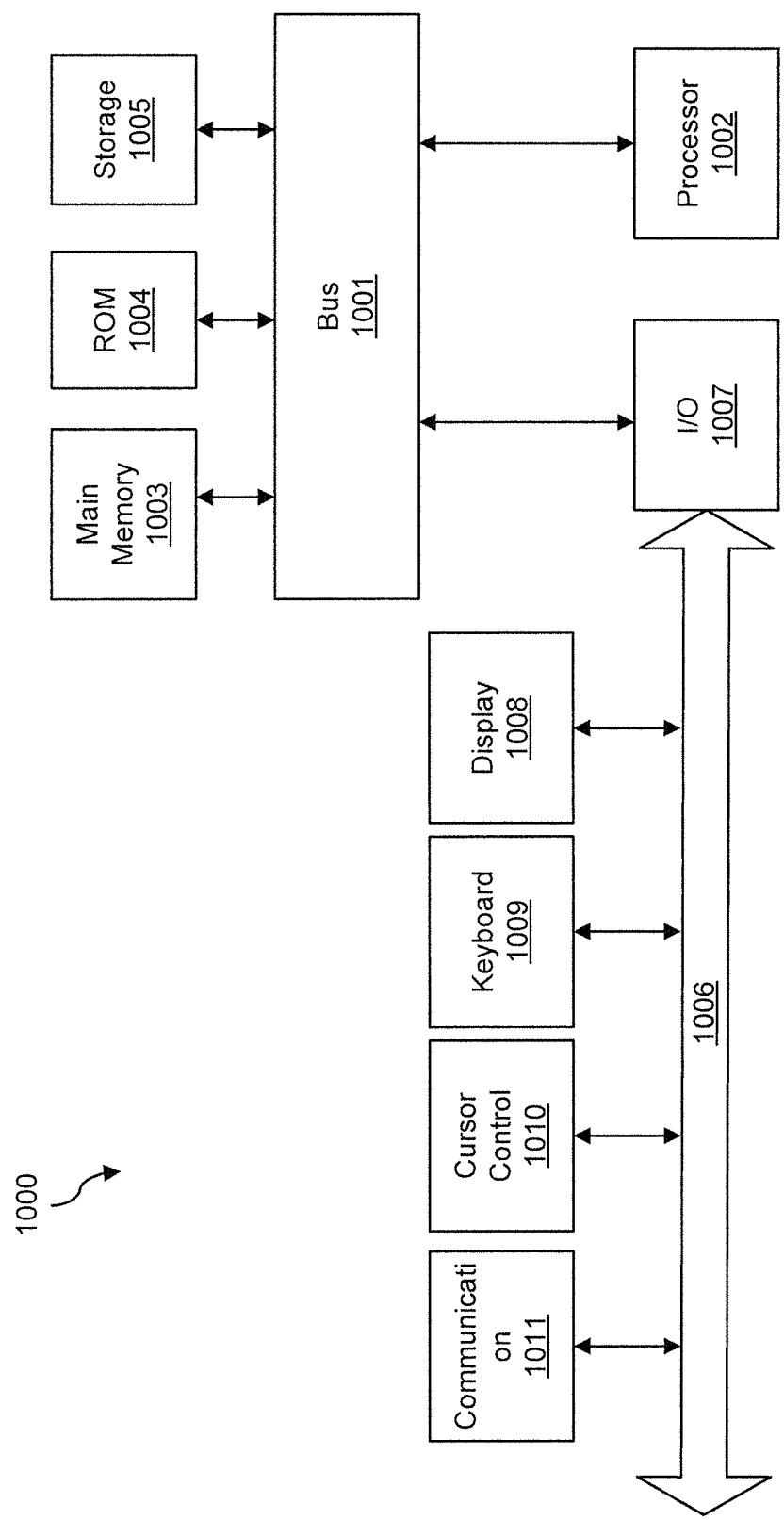
FIG. 10 illustrates an exemplary computer architecture that may be used for the present system, according to one embodiment.

FIG. 10 illustrates an exemplary computer architecture that may be used for the present system, according to one embodiment. The exemplary computer architecture may used for implementing one or more components described in the present disclosure including, but not limited to, the present system. One embodiment of architecture 1000 includes a system bus 1001 for communicating information, and a processor 1002 coupled to bus 1001 for processing information. Architecture 1000 further comprises a random access memory (RAM) (referred to herein as main memory) or other dynamic storage device 1003, coupled to bus 1001 for storing information and instructions to be executed by processor 1002. Main memory 1003 also may be used for storing temporary variables or other intermediate information during execution of instructions by processor 1002. Architecture 1000 may also include a read only memory (ROM) and/or other static storage device 1004 coupled to bus 1001 for storing static information and instructions used by processor 1002.

A data storage device 1005 such as a magnetic disk or optical disc and its corresponding drive may also be coupled to architecture 1000 for storing information and instructions. Architecture 1000 can also be coupled to a second I/O bus 1006 via an I/O interface 1007. A plurality of I/O devices may be coupled to I/O bus 1006, including a display device 1008, an input device (e.g., an alphanumeric input device 1009 and/or a cursor control device 1010).

The communication device 1011 allows for access to other computers (e.g., servers or clients) via a network. The communication device 1011 may comprise one or more modems, network interface cards, wireless network interfaces or other interface devices, such as those used for coupling to Ethernet, token ring, or other types of networks.

The above example embodiments have been described herein to illustrate various embodiments for systems and methods for proportioned power distribution in power converter arrays. Various modifications and departures from the disclosed example embodiments will occur to those having ordinary skill in the art. The subject matter that is intended to be within the scope of the invention is set forth in the following claims.

We claim:
1. A method, comprising:
distributing a node-specific transfer function to each node of a plurality of nodes via a communication bus, wherein each node comprises a power converter circuit, wherein nodes of the plurality of nodes are electrically connected in series, and wherein each node-specific transfer function enables each node to contribute a positive impedance to a total impedance of the plurality of nodes;
coordinating a setting of a parameter of each node-specific transfer function for the plurality of nodes to regulate a common bus current across the plurality of nodes; and
assigning to each node an electrical characteristic based on the parameter of each node-specific transfer function.

2. The method of claim 1, wherein the node-specific transfer function comprises one or more of a first current component that is common to the plurality of nodes, a node-specific voltage coefficient that is linearly related to the assigned electrical characteristic, and a node-specific resistance coefficient that relates to the node-specific voltage coefficient by a scaling coefficient, wherein the scaling coefficient for the plurality of nodes is common.

3. The method of claim 1, wherein the power converter circuit comprises one or more switched-mode power supplies.

4. The method of claim 2, wherein the node-specific transfer function comprises a second current component based on a difference between a cycle-by-cycle average current and a peak current in the power converter circuit.

5. The method of claim 2, further comprising selecting a minimum node-specific resistance value and a capacitance value of a filter capacitor based on a power converter control loop bandwidth, wherein the filter capacitor is part of the node.

6. The method of claim 1, further comprising varying the assigned electrical characteristic at arbitrary times while maintaining continuous stable operation.

7. The method of claim 2, wherein the node-specific voltage coefficient is further based on a nominal efficiency of the power converter circuit.

8. The method of claim 2, further comprising distributing one or more of the first current component, the node-specific voltage coefficient and the node-specific resistance coefficient via one or more of digital and analog communication means.

9. The method of claim 2, further comprising adjusting one or more of the first current component, the node-specific voltage coefficient and the node-specific resistance coefficient to correct a difference between a measured electrical characteristic across the node and the assigned electrical characteristic.

10. The method of claim 1, wherein the electrical characteristic comprises one of a voltage, an energy over time, and a proportion of an aggregate power across the plurality of nodes.

11. The method of claim 2, wherein determining the first current component is based on a minimum given current flowing through the plurality of nodes.

12. The method of claim 2, wherein two or more pluralities of nodes are electrically connected in parallel.

13. The method of claim 12, wherein the first current component is linearly related to an assigned fraction of an aggregate power across the two or more pluralities of nodes.

14. The method of claim 13, wherein a sum total of node-specific voltage coefficients for each plurality of nodes is common to the two or more pluralities of nodes that are electrically connected in parallel.

15. The method of claim 14, wherein the scaling coefficient is inversely proportional to the first current component that is common to the plurality of nodes.

16. The method of claim 14, wherein the scaling coefficient is proportional to a maximum first current component of two or more first current components.

17. The method of claim 1, wherein each node comprises an energy storage cell electrically connected to the power converter circuit.

18. The method of claim 17, further comprising determining the assigned proportion of the aggregate power of the plurality of nodes based on one or more of historical energy storage cell characteristics, energy storage cell degradation characteristics, energy storage cell performance characteristics, and predicted energy storage cell performance characteristics.

19. A non-transitory computer-readable medium having stored thereon computer-readable instructions, and a processor coupled to the non-transitory computer readable medium, wherein the processor executes the instructions:
distribute a node-specific transfer function to each node of a plurality of nodes via a communication bus, wherein each node comprises a power converter circuit, wherein nodes of the plurality of nodes are electrically connected in series, and wherein each node-specific transfer function enables each node to contribute a positive impedance to a total impedance of the plurality of nodes;
coordinate a setting of a parameter of each node-specific transfer function for the plurality of nodes to regulate a common bus current across the plurality of nodes; and
assign to each node an electrical characteristic based on the parameter of each node-specific transfer function.

20. The non-transitory computer-readable medium of claim 19, wherein the node-specific transfer function comprises one or more of a first current component that is common to the plurality of nodes, a node-specific voltage coefficient that is linearly related to the assigned electrical characteristic, and a node-specific resistance coefficient that relates to the node-specific voltage coefficient by a scaling coefficient, wherein the scaling coefficient for the plurality of nodes is common.

21. The non-transitory computer-readable medium of claim 19, wherein the power converter circuit comprises one or more switched-mode power supplies.

22. The non-transitory computer-readable medium of claim 20, wherein the node-specific transfer function comprises a second current component based on a difference between a cycle-by-cycle average current and a peak current in the power converter circuit.

23. The non-transitory computer-readable medium of claim 20, wherein the processor executes the instructions to select a minimum node-specific resistance value based on a power converter control loop bandwidth and a given capacitance value of a filter capacitor, wherein the filter capacitor is part of the node.

24. The non-transitory computer-readable medium of claim 19, wherein the processor executes the instructions to vary the assigned electrical characteristic at arbitrary times while maintaining continuous stable operation.

25. The non-transitory computer-readable medium of claim 20, wherein the node-specific voltage coefficient is further based on a nominal efficiency of the power converter circuit.

26. The non-transitory computer-readable medium of claim 20, wherein the processor executes the instructions to distribute one or more of the first current component, the node-specific voltage coefficient and the node-specific resistance coefficient via one or more of digital and analog communication means.

27. The non-transitory computer-readable medium of claim 20, wherein the processor executes the instructions to adjust one or more of the first current component, the node-specific voltage coefficient and the node-specific resistance coefficient to correct a difference between a measured electrical characteristic across the node and the assigned electrical characteristic.

28. The non-transitory computer-readable medium of claim 19, wherein the electrical characteristic comprises one of a voltage, an energy over time, and a proportion of an aggregate power across the plurality of nodes.

29. The non-transitory computer-readable medium of claim 20, wherein the processor executes the instructions to determine the first current component based on a minimum given current flowing through the plurality of nodes.

30. The non-transitory computer-readable medium of claim 20, wherein two or more pluralities of nodes are electrically connected in parallel.

31. The non-transitory computer-readable medium of claim 30, wherein the first current component is linearly related to an assigned fraction of an aggregate power across the two or more pluralities of nodes.

32. The non-transitory computer-readable medium of claim 31, wherein a sum total of node-specific voltage coefficients for each plurality of nodes is common to the two or more pluralities of nodes that are electrically connected in parallel.

33. The non-transitory computer-readable medium of claim 32, wherein the scaling coefficient is inversely proportional to the first current component that is common to the plurality of nodes.

34. The non-transitory computer-readable medium of claim 32, wherein the scaling coefficient is proportional to a maximum first current component of two or more first current components.

35. The non-transitory computer-readable medium of claim 19, wherein each node comprises an energy storage cell electrically connected to the power converter circuit.

36. The non-transitory computer-readable medium of claim 35, wherein the processor executes the instructions to determine the assigned proportion of the aggregate power of the plurality of nodes based on one or more of historical energy storage cell characteristics, energy storage cell degradation characteristics, energy storage cell performance characteristics, and predicted energy storage cell performance characteristics.

37. A system, comprising:
a plurality of nodes, wherein a node of the plurality of nodes comprises a power converter circuit; and wherein nodes of the plurality of nodes are electrically connected in series;
a central processor in communication with the plurality of nodes by registers, wherein the central processor:
distributes a node-specific transfer function to each node of a plurality of nodes via a communication bus, wherein each node comprises a power converter circuit, wherein nodes of the plurality of nodes are electrically connected in series, and wherein each node-specific transfer function enables each node to contribute a positive impedance to a total impedance of the plurality of nodes;
coordinates a setting of a parameter of each node-specific transfer function for the plurality of nodes to regulate a common bus current across the plurality of nodes; and
assigns to each node an electrical characteristic based on the parameter of each node-specific transfer function.

38. The system of claim 37, wherein the node-specific transfer function comprises one or more of a first current component that is common to the plurality of nodes, a node-specific voltage coefficient that is linearly related to the assigned electrical characteristic, and a node-specific resistance that relates to the node-specific voltage coefficient by a scaling coefficient, wherein the scaling coefficient for the plurality of nodes is common.

39. The system of claim 37, wherein the power converter circuit comprises one or more switched-mode power supplies.

40. The system of claim 38, wherein the node-specific transfer function comprises a second current component based on a difference between a cycle-by-cycle average current and a peak current in the power converter circuit.

41. The system of claim 38, wherein the central processor selects a minimum node-specific resistance value based on a power converter control loop bandwidth and a given capacitance value of a filter capacitor, wherein the filter capacitor is part of the node.

42. The system of claim 37, wherein the central processor varies the assigned electrical characteristic at arbitrary times while maintaining continuous stable operation.

43. The system of claim 38, wherein the node-specific voltage coefficient is further based on a nominal efficiency of the power converter circuit.

44. The system of claim 38, wherein the central processor distributes one or more of the first current component, the node-specific voltage coefficient and the node-specific resistance coefficient via one or more of digital and analog communication means.

45. The system of claim 38, wherein the central processor adjusts one or more of the first current component, the node-specific voltage coefficient and the node-specific resistance coefficient to correct a difference between a measured electrical characteristic across the node and the assigned electrical characteristic.

46. The system of claim 37, wherein the electrical characteristic comprises one of a voltage, an energy over time, and a proportion of an aggregate power across the plurality of nodes.

47. The system of claim 38, wherein the central processor determines the first current component based on a minimum given current flowing through the plurality of nodes.

48. The system of claim 38, wherein two or more pluralities of nodes are electrically connected in parallel.

49. The system of claim 48, wherein the first current component is linearly related to an assigned fraction of an aggregate power across the two or more pluralities of nodes.

50. The system of claim 49, wherein a sum total of node-specific voltage coefficients for each plurality of nodes is common to the two or more pluralities of nodes that are electrically connected in parallel.

51. The system of claim 50, wherein the scaling coefficient is inversely proportional to the first current component that is common to the plurality of nodes.

52. The system of claim 50, wherein the scaling coefficient is proportional to a maximum first current component of two or more first current components.

53. The system of claim 37, wherein each node comprises an energy storage cell electrically connected to the power converter circuit.

54. The system of claim 53, wherein the central processor determines the assigned proportion of the aggregate power of the plurality of nodes based on one or more of historical energy storage cell characteristics, energy storage cell degradation characteristics, energy storage cell performance characteristics, and predicted energy storage cell performance characteristics.

* * * * *